United States Patent [19]

Morimitsu et al.

[11] Patent Number: 4,837,310

[45] Date of Patent: Jun. 6, 1989

[54] RED OR BLUISH-RED FIBER-REACTIVE MONOAZO COMPOUND HAVING 7-SUBSTITUTED AMINO-1-NAPHTHOL-SULFONIC ACID AS COUPLING COMPONENT BETWEEN THE CHROMOPHORE AND FIBER REACTIVE PORTIONS OF THE COMPOUND

[75] Inventors: Toshihiko Morimitsu; Sadanobu Kikkawa, both of Minoo; Takashi Omura, Ashiya, all of Japan

[73] Assignee: Sumitomo Chemical Company, Limited, Osaka, Japan

[21] Appl. No.: 1,852

[22] Filed: Jan. 9, 1987

[30] Foreign Application Priority Data

Jan. 16, 1986 [JP] Japan .................................. 61-7696
Jan. 17, 1986 [JP] Japan .................................. 61-8453

[51] Int. Cl.[4] .................... C09B 62/085; C09B 62/51; D06P 1/382; D06P 1/384
[52] U.S. Cl. .................................. 534/638; 534/598; 534/642
[58] Field of Search .............................. 534/638, 642

[56] References Cited

U.S. PATENT DOCUMENTS

| | | | |
|---|---|---|---|
| 3,223,470 | 12/1965 | Boedeker et al. | 534/638 X |
| 4,191,687 | 3/1980 | Austin | 534/638 |
| 4,667,022 | 5/1987 | Nakamatsu et al. | 534/638 |

FOREIGN PATENT DOCUMENTS

| | | | |
|---|---|---|---|
| 0035171 | 9/1981 | European Pat. Off. | 534/638 |
| 0036582 | 9/1981 | European Pat. Off. | 534/638 |
| 0053097 | 6/1982 | European Pat. Off. | 534/638 |
| 2248301 | 5/1975 | France. | |
| 56-103247 | 8/1981 | Japan | 534/638 |
| 56-128379 | 10/1981 | Japan | 534/638 |
| 57-199877 | 12/1982 | Japan | 534/638 |
| 58-15559 | 1/1983 | Japan | 534/638 |
| 58-198567 | 11/1983 | Japan | 534/638 |
| 59-86661 | 5/1984 | Japan | 534/638 |
| 2024840 | 1/1980 | United Kingdom | 534/636 |

OTHER PUBLICATIONS

Chemical Abstracts, vol. 98, No. 26, Jun. 1983, p. 83, Abstract 217159s (JP-A-57-199,877/Corresponds to Ref. "O"/Sumitomo IV–cited in Paper #5).

*Primary Examiner*—Floyd D. Higel
*Attorney, Agent, or Firm*—Stevens, Davis, Miller & Mosher

[57] ABSTRACT

A monoazo compound of the following formula in a free acid form,

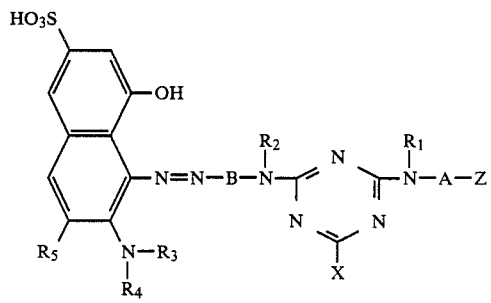

wherein $R_1$, $R_2$ and $R_4$ are independently hydrogen or lower alkyl, $R_3$ is lower alkyl, acyl or (sulfo)-phenyl, $R_5$ is hydrogen or sulfo, B is (sulfo)phenylene or sulfonaphthylmethylene, X is chlorine, fluorine, phenoxy or (substituted)amino, A is (substituted)phenylene or (substituted)naphthylene, and Z is $-SO_2CH=CH_2$ or $-SO_2CH_2CH_2Y$ in which Y is a splittable group by the action of an alkali, which meets requirements of high degree in a dye industry with respect to dyeing properties such as build-up property and fastness properties such as formalin fastness, formalin-light fastness.

6 Claims, No Drawings

RED OR BLUISH-RED FIBER-REACTIVE MONOAZO COMPOUND HAVING 7-SUBSTITUTED AMINO-1-NAPHTHOL-SULFONIC ACID AS COUPLING COMPONENT BETWEEN THE CHROMOPHORE AND FIBER REACTIVE PORTIONS OF THE COMPOUND

The present invention relates to a fiber-reactive monoazo compound having a 7-susbstituted amino-1-naphthol mono-or di-sulfonic acid as a coupling component, production thereof and application thereof for dyeing and printing fiber materials.

Various kinds of fiber-reactive dyes have heretofore been used for dyeing or printing fiber materials. Of these, reactive dyes having both monohalogenotriazinyl group and vinylsulfone type group such as sulfatoethylsulfonyl group in one molecule are prominent because of their improved dye performances. As reactive dyes of this kind useful for dyeing or printing fiber materials in red color, for example, a monoazo compound having the following formula,

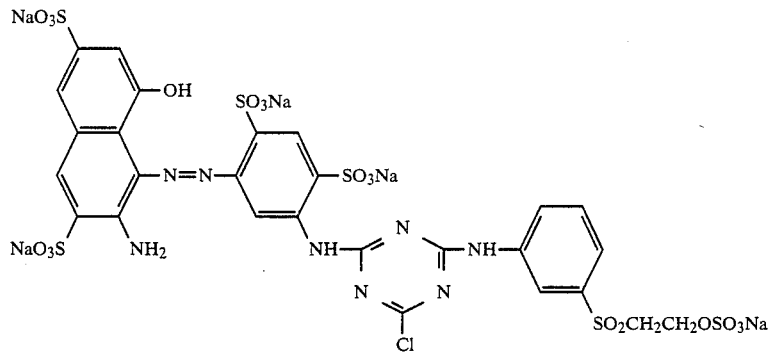

is disclosed in Published Unexamined Japanese Patent Application No. 199877/1982. However, known red dyes of this kind including the compound of the above formula are not yet satisfactory to meet the requirements of high degree with respect to dyeing properties such as build-up property, insusceptibility to changes in dyeing temperature and the like as well as fastness properties such as formalin fastness, foralin-light fastness and the like, and therefore they wait for a still further improvement of such dye performances.

The present inventors have undertaken extensive studies to find monoazo compounds meeting the aforementioned requirements, and attained to the present invention.

The present invention provides a monoazo compound of the following formula (I), or a salt thereof,

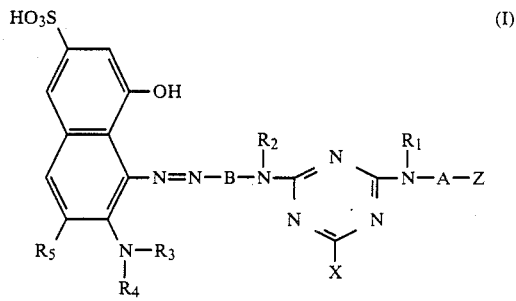

wherein $R_1$ and $R_2$ independently of one another denote hydrogen or unsubstituted or substituted lower alkyl, $R_3$ denotes unsubstituted or substituted lower alkyl, acyl or a group of the formula,

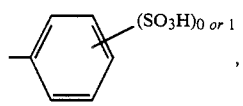

$R_4$ denotes hydrogen or unsubstituted or substituted lower alkyl, and $R_5$ denotes hydrogen or sulfo, B denotes a group of the formula,

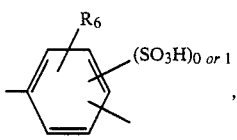

in which $R_6$ is hydrogen, chloride, sulfo, carboxy, methyl, methoxy or ethoxy, or a group of the formula,

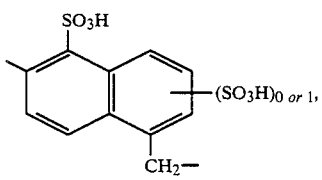

X denotes chloride, fluorine, lower alkoxy, unsubstituted or substituted phenoxy, or a group of the formula,

in which $R_7$ and $R_8$ independently of one another are hydrogen or an unsubstituted or substituted lower alkyl, phenyl, naphtyl or benzyl group, A denotes an unsubstituted or substituted phenylene or napthylene group, and Z denotes a group of the formula, $-SO_2CH=CH_2$ or $-SO_2CH_2CH_2Y$, is a group splittable by the action of an alkali, and a process for producing the monoazo compound of the formula (I), which comprises (a) reacting a diazonium salt of an amine compound of the following the formula (IV),

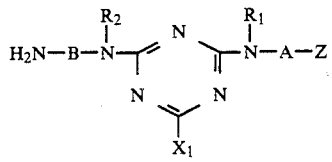

wherein $R_1$, $R_2$, A, B and Z are defined above, and $X_1$ denotes chloride of fluorine, with a naphthol compound of the following formula (V),

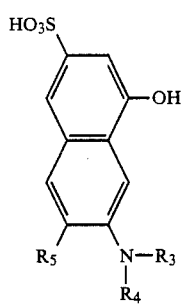

wherein $R_3$, $R_4$ and $R_5$ are as defined above, or reacting any one of an aromatic amine compound of the following formula (III),

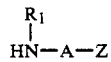

wherein $R_1$, A and Z are as defined above, or a monoaza naphthol compound of the following formula (VII),

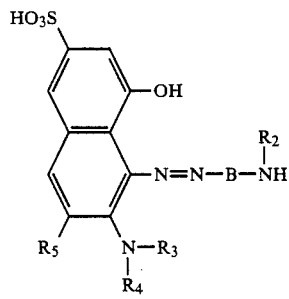

wherein $R_2$, $R_3$, $R_4$, $R_5$ and B are as defined above, with cyanuric chloride or cyanuric fluoride, followed by the reaction with the remaining one, to obtain a monoazo compound of the following formula (I'),

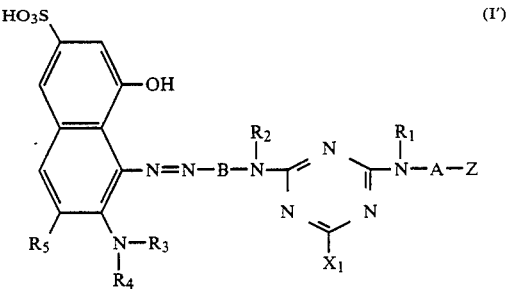

wherein $R_1$, $R_2$, $R_3$, $R_4$, $R_5$, A, B, $X_1$ and Z are as defined above, which corresponds to the monoazo compound of the formula (I) having chlorine or fluorine as X, or (b) reacting the monoazo compound of the formula (I') with a compound of the following formula (VIII),

wherein $X_2$ denotes lower alkoxy, unsubstituted or substituted phenoxy or a group of the formula,

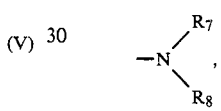

wherein $R_7$ and $R_8$ are as defined above, or reacting any one of the monoazo naphthol compound of the formula (VII) or the compound of the formula (VIII) with cyanuric chloride or cyanuric fluoride, followed by the reaction with the remaining one, and then with the aromatic amine compound of the formula (III), to obtain a monoazo compound of the following formula (I''),

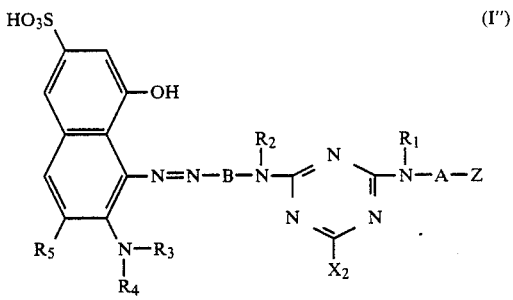

wherein $R_1$, $R_2$, $R_3$, $R_4$, $R_5$, A, B, $X_2$ and Z are as defined above, which corresponds to the monoazo compound of the formula (I) having lower alkoxy, unsubstituted or substituted phenoxy or a group of the formula

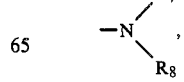

wherein $R_7$ and $R_8$ are as defined above.

The present invention also provides a process for dyeing or printing fiber materials, which comprises using the monoazo compound of the formula (I) or a salt thereof.

Among these monoazo compounds of the formula (I), preferred are compounds of the following formulae,

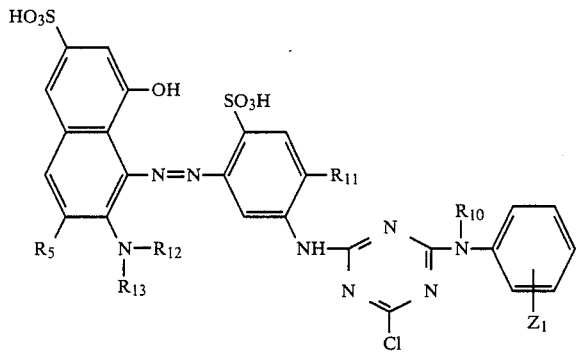

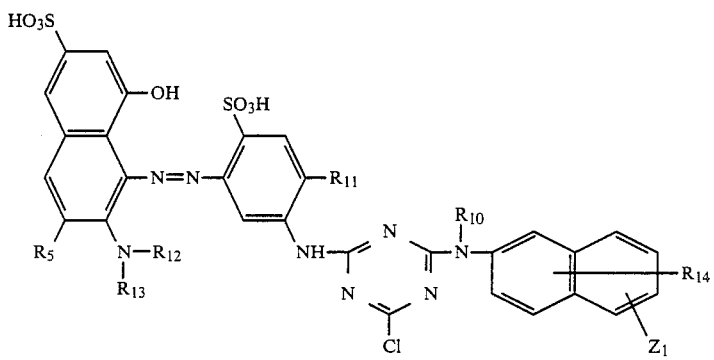

wherein $R_5$ is as defined above, $R_{10}$ denotes hydrogen, methyl or ethyl, $R_{11}$ denotes hydrogen, chlorine or sulfo, $R_{12}$ denotes methyl, ethyl, acetyl or propionyl, $R_{13}$ denotes hydrogen, methyl or ethyl, $R_{14}$ denotes hydrogen or sulfo, and $Z_1$ denotes $-SO_2CH=CH_2$ or $-SO_2CH_2CH_2OSO_3H$.

In the present invention, the lower alkyl group represented by $R_1$, $R_2$, $R_3$ and $R_4$ is intended to mean an alkyl group preferably having 1 to 4 carbon atoms, and preferable substituents of the alkyl group include hydroxyl, cyano, $C_1$–$C_4$ alkoxy, halogeno, carboxy, carbamoyl, cyano, $C_1$–$C_4$ alkoxycarbonyl, $C_1$–$C_1$–$C_4$ alkylcarbonyloxy, sulfo, sulfamoyl and the like. Preferred examples of the unsubstituted or substitiuted alkyl group represented by $R_1$, $R_2$, $R_3$ and $R_4$ are methyl, ethyl, n-propyl, iso-propyl, n-butyl, iso-butyl, sec-butyl, 2-hydroxyethyl, 2-hydroxypropyl, 2-hydroxybutyl, 3-hydroxybutyl, 2-hydroxybutyl, 3-hydroxybutyl, 4-hydroxybutyl, 2,3-dihydroxypropyl, 3,4-dihydroxybutyl, cyanomethyl, 2-cyanoethyl, 3-cyanopropyl, methoxymethyl, ethoxymethyl, 2-methoxyethyl, 2-ethoxyethyl, 3-methoxypropyl, 3-ethoxypropyl, 2-hydroxy-3-methoxypropyl, chloromethyl, bromomethyl, 2-chloroethyl, 2-bromethyl, 3chloropropyl, 3-bromopropyl, 4-chlorobutyl, 4-bromobutyl, carboxymethyl, 2-carboxyethyl, 3-carboxypropyl, 4-carboxybutyl, 1,2-dicarboxyethyl, carbamoylmethyl, 2-carbamoylethyl, 3-carbamoylpropyl 4-carbamoylmethyl, methoxycarbonylmethyl, ethoxycarbonylmethyl, 2-methoxycarbonylethyl, 2ehtoxycarbonylethyl, 3-methoxycarbonylpropyl, 3-ethoxy-carbonylpropyl, 4-methoxycarbonylbutyl, 4-ethoxycarbonyl-butyl, methyocarbonyloxymethyl, ethylcarbonyloxymethyl, 2-methylcarbonyloxyethyl, 2-ethylcarbonyloxyethyl, 3-methylcarbonyloxypropyl, 3-ethylcarbonyloxypropyl, 4-methylcarbonyloxybutyl, 4-ethylcarbonyloxybutyl, sulfomethyl, 2-sulfoethyl, 3-sulfopropyl, 4-sulfobutyl, sulfamoylmethyl, 2-sulfamoylethyl, 3-sulfamoylpropyl, 4-sulfamoylbutyl and the like. Of these, particularly preferred $R_1$, $R_2$ and $R_4$ are independently hydrogen, methyl or ethyl.

Examples of the acyl represented by $R_3$ are acetyl, propionyl, butyryl, isobutyryl, valeryl and benzoyl, and examples of the group,

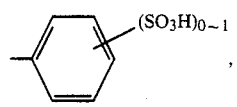

represented by $R_3$ are

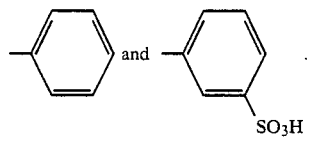

of these $R_3$, preferred are acetyl or propionyl.

The phenylene group represented by A includes, for example, phenylene groups unsubstituted and substituted with one or two members selected from methyl, ethyl, methoxy, ethoxy, chlorine, bromine and sulfo, and the napthylene group represented also by A includes naphthylene and sulfo-substituted naphthylene. Preferred examples of the phenylene and naphthylene groups are as follows.

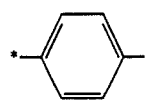
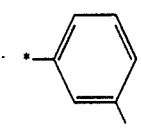
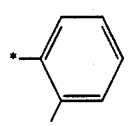
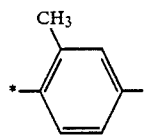
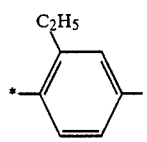
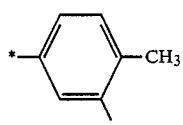
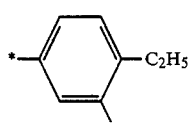
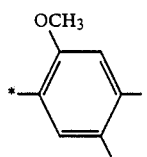
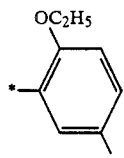
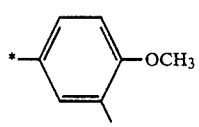
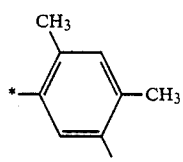
-continued
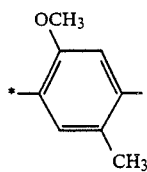
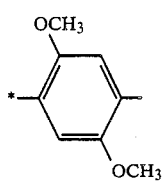
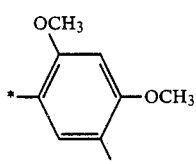
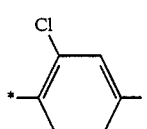
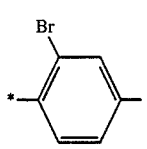
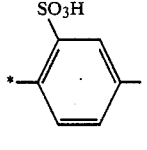
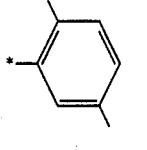
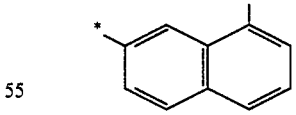
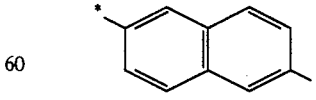
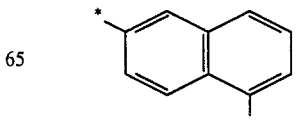

-continued

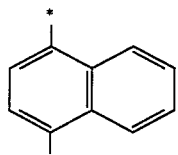

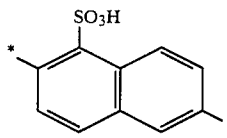

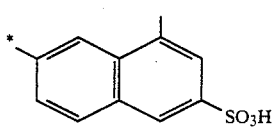

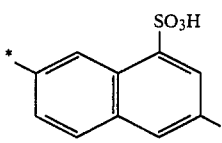

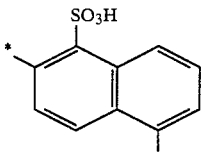

(In the above formulae, the asterisked linkage is bonded to the group,

The symbol Y in the group, —SO$_2$CH$_2$CH$_2$Y represented by Z, denotes a group splittable by the action of an alkali, and includes, for example, sulfuric acid ester, thiosulfuric acid ester, phosphoric acid ester and acetic acid ester groups, and halogen atoms. Of these, particularly preferred Z are —SO$_2$CH=CH$_2$ and —SO$_2$CH$_2$CH$_2$OSO$_3$H.

Examples of the groups represented by B are as follows.

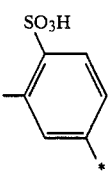

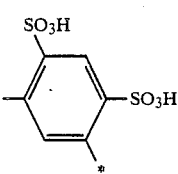

-continued

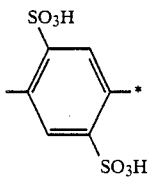

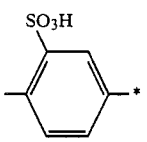

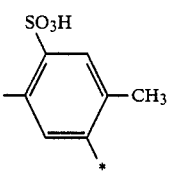

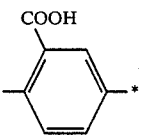

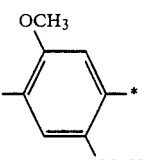

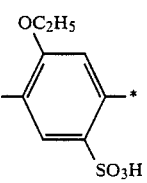

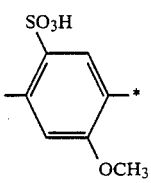

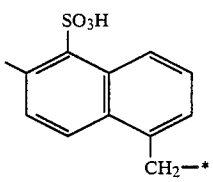

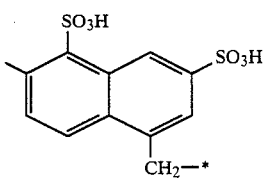

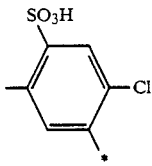

(In the above formulae, the asterisked linkage is bonded to the group,

)

With respect to the lower alkoxy group represented by X, preferred are ones having 1 to 4 carbon atoms, which include for example, methoxy, ethoxy, n-propoxy, iso-propoxy, n-butoxy, iso-butoxy and the like. Particularly preferred are methoxy, ethoxy, n-propoxy, iso-propoxy and β-ethoxyethoxy.

Preferred examples of the phenoxy group represented also by X are ones unsubstituted or substituted with one or two members selected from $C_1$-$C_4$ alkyl, $C_1$-$C_4$ alkoxy, nitro, sulfo, carboxyl and chlorine. Particularly preferred are phenoxy, 3-or 4-sulfophenoxy, 2,4-or 3,5-disulfophenoxy and the like.

With respect to the group,

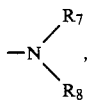

represented by X, preferred lower alkyl groups represented by $R_7$ and $R_8$ are ones which have 1 to 4 carbon atoms and are unsubstituted or substituted with one or two members selected from $C_1$-$C_4$ alkoxy, sulfo, carboxyl, hydroxy, chlorine, phenyl and sulfate. Particularly preferred ones are methyl, ethyl, n-propyl, iso-propyl, n-butyl, iso-butyl, sec-butyl, 2-hydroxyethyl, 2-sulfatoethyl, 2-suloethyl, 2-methoxyethyl and 2-carboxyethyl.

Preferred phenyl groups represented also by $R_7$ and $R_8$ are ones unsubstituted or substituted with one or two members selected from $C_1$-$C_4$ alkyl, $C_1$-$C_4$ alkoxy, sulfo, carboxyl and chlorine. Of these, particularly preferred are phenyl, 2-, 3-or 4-sulfophenyl, 2-, 3-or 4-carboxyphenyl, 3,4-, 3,5- or 3,6-disulfophenyl, and the like.

Preferred naphthyl groups represented also by X are ones unsubstituted or substituted with one to three members selected from hydroxyl, carboxyl, sulfo, $C_1$-$C_4$ alkyl, $C_1$-$C_4$ alkoxy and chlorice. Of these, particularly preferred are 2-, 3-, 4-, 5-, 6-, 7-or 8-sulfo-2- naphthyl, 1-, 5-, 6-, 7-or 8-sulfo-2-naphtyhl, 2,4-, 5,7-, 6,8-, 4,8-, 4,7-, 3,8-, 4,6-, 3,7-or 3,6-disulfo-2naphthyl, 4,6,8-, 2,4,7-or 3,6,8-trisulfo-1-naphthyl, 1,5,7-, 4,6,8-or 3,6,8-trisulfo-2-naphthyl and the like.

Preferred benzyl groups represented also by $R_7$ and $R_8$ are ones unsubstituted or substituted with one or two members selected from $C_1$-$C_4$ alkyl, $C_1$-$C_4$ alkoxy, sulfo and chlorine. Of these, particularly preferred are benzyl and 2-, 3-or 4-sulfobenzyl.

The present monoazo compound of the above formula (I) may be in the form of a free acid or a salt of alkali or alkaline earth metal. Of these, preferred are sodium salt and potassium salt.

The monoazo compound of the above formula (I') having a chlorine or bromine atom as X in the formula (I) can be produced, for example, in the following manner.

Any one of a diamine compound of the following formula (II),

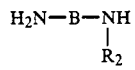
(II)

wherein $R_2$ and B are as defined above, or the aromatic amine of the formula (III) are subjected to first condensation with cyanuric chloride or fluoride, followed by second condensation with the remaining one of (III) or (II). The first and second condensations can be carried out in an aqueous medium at a temperature of $-10°$ to 50° C., preferably 0° to 30° C., and at a pH of 1 to 10, preferably 2 to 7, and at a temperature of 0° to 70° C. and at a preferred pH of 3 to 7, respectively.

The resulting amine compound represented by the formula (IV) can be diazotized at a temperature of $-10°$ to 20° C. in a conventional manner, followed by coupling with the naphthol compound of the formula (V), at a temperature of $-10°$ to 50° C., preferably 0° to 30° C., while controlling the pH within a range of 1 to 7, preferably 1 to 5, whereby the desired monoazo compound (I') can be produced.

Alternatively, the monoazo compound of the formula (I') can be produced also in the following manner.

The diamine compound (II) or a nitro compound of the following formula (IX), $$H_2N - B - NO_2 \qquad (IX)$$

wherein B is an defined above, is diazotized at a temperature of $-10°$ to 20° C. in a conventional manner, followed by coupling with the naphthol compound (V) at a temperature of $-10°$ to 50° C., preferably 0° to 30° C., while controlling the pH within a range of 1 to 7, preferably 1 to 5. The resulting compound obtained using the nitro compound (IX) is then followed with reduction at a temperature of 40° to 100° C. in the presence of sodium sulfide. According to any one of the above manners, the monoazo naphthol compound of the formula (VII) can be produced.

Successively, any one of the manoazo naphthol compound (VII) or the aromatic amine compound (III) are subjected to first condensation with cyanuric chloride or fluoride, followed by second condensation with the remaining one of (III) or (VII), at a temperature of $-10°$ to 50° C., preferably 0° to 30° C., while controlling the pH within a range of 1 to 10, preferably 2 to 7, and at a temperature of 0° to 70° C., preferably 10° to 50° C., while controlling the pH within a range of 2 to 9, preferably 3 to 6, respectively, thereby obtaining the desired monoazo compound (I').

The monoazo compound of the formula (I'') having as X in the formula (I) a lower alkoxy or unsubstituted or substituted phenoxy group or a group of the formula,

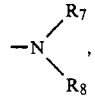

in which $R_7$ and $R_8$ are as defined above can be produced, for example, in the following manner.

The monoazo compound (I″) which can be produced in the manners as described above is subjected to condensation with a compound represented by the following formula (VIII), $$H-X_2 \quad (VIII)$$

wherein $X_2$ is as defined above, in an aqueous medium at a temperature of 50° to 100° C., preferably 70° to 100° C., while controlling the pH within a range of 2 to 9, preferably 3 to 7.

Alternatively, any one of the monoazo naphthol compound (VII) or the compound (VIII) is subjected to first condensation with cyanuric chloride or fluoride, followed by second condensation with the remaining one of (VIII) or (VII). The first condensation can be carried out at a temperature of −10° to 50° C., preferably 0° to 30° C., while controlling the pH within a range of 1 to 10, preferably 4 to 7, and the second condensation at a temperature of 10° to 70° C., preferably 20° to 50° C., while controlling the pH within a range of 2 to 10, preferably 4 to 9. Successively, the resulting compound is subjected to condensation with the aromatic amine compound (III) at a temperature of 50° to 100° C., preferably 80° to 100° C., while controlling the pH within a range of 2 to 9, preferably 3 to 7.

Thus, the desired monoazo compound of the formula (I″) can be produced.

Particularly preferred examples of the naphthol compounds (V) usable for the production of the monoazo compound (I) are as follows.

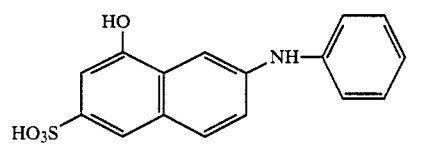

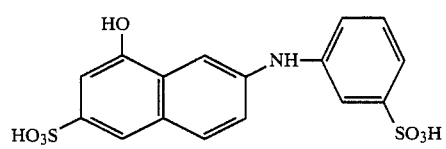

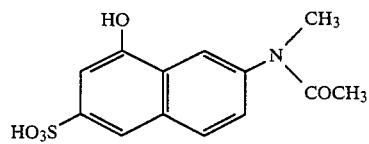

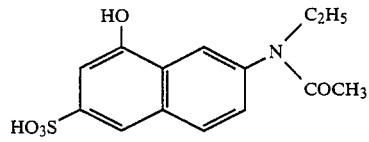

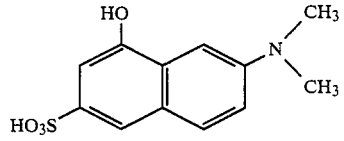

-continued

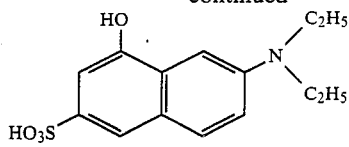

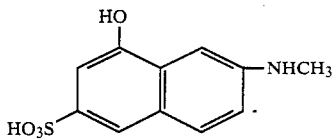

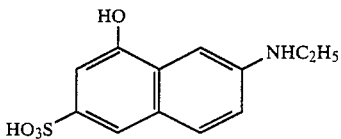

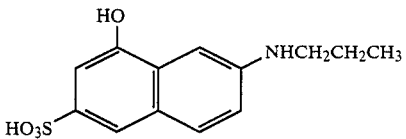

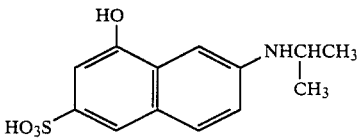

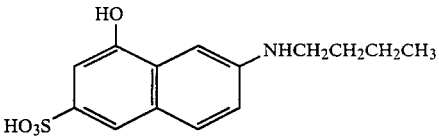

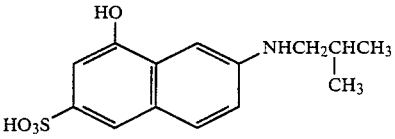

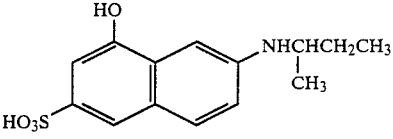

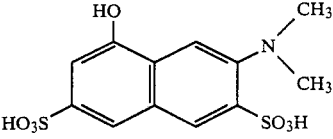

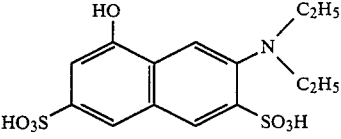

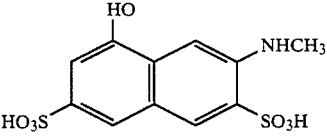

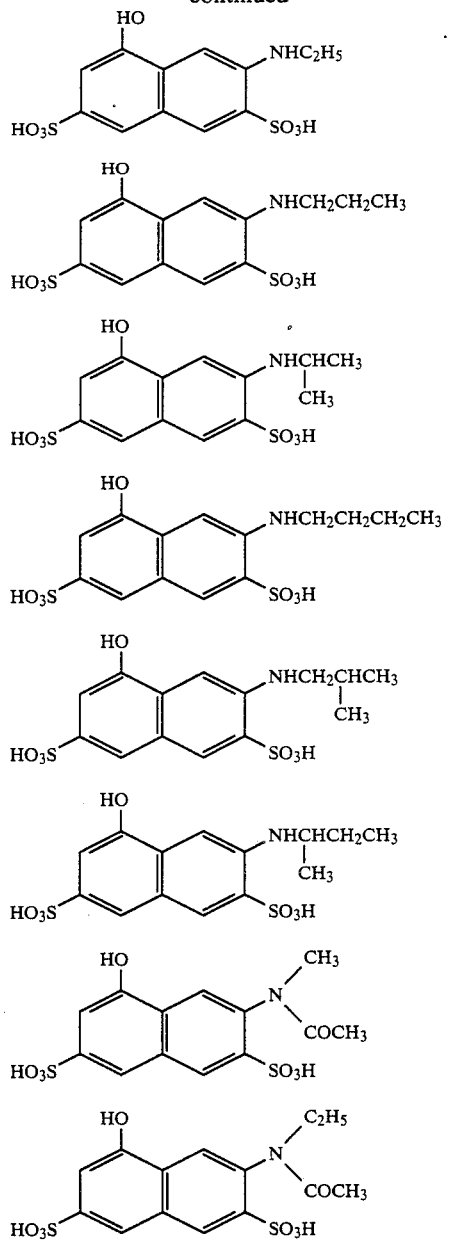

The compound (VIII) usable for the production of the monoazo compound (I) includes ammonia, aromatic and aliphatic amines, lower alcohols and substituted phenols.

Examples of the aromatic amine are 1-aminobenzene, 1-amino-2-, 3-or 4-methylbenzene, 1-amino-2,4-, 2,5-, 3,4-or 3,5-dimethylbenzene, 1-amino-2-, 3-or 4-ethylbenzene, 1-amino-2-, 3-or 4methoxybenzene, 1-amino-4-ethoxbenzene, 1-amino-2-, 3-or 4-chloro-benzene, 3-or 4-amino-phenymethanesulfonic acid, 2-, 3-or 4-aminobenzenesulfonic acid, 3-methylamino-benzenesulfonic acid, 3-methylamino-benzenesulfonic acid, 4-methylaminobenzenesulfonic acid, 4-ethylaminobenzenesulfonic acid, 5-aminobenzene-1,3-disulfonic acid, 2-aminobenezene-1,4-disulfonic acid, 4-aminobenzene-1,3- disulfonic acid, 2-, 3-or 4-aminobenzoic acid, 5-aminobenzene-1,3-dicarboxylic acid, 5amino-2-hydroxybenzenesulfonic acid, 4-amino-2-hydroxybenzenesulfonic acid, 5-amino-2-ethoxybenzene-sulfonic acid, N-methylaminobenzene, N-ethylaminobenzene, 1-ethylamino-3-or 4-methylbenzene, 1-ethylamino-4-chlorobenzene, 1-ethylamino-3-or 4-methylbenzene, 1-(2-hydroxyethyl)amino-3-methylbenzene, 3-or 4-methylaminobenzoic acid, 3-or 4-methylaminobenzenesulfonic acid, 2-aminonaphthalene-1-sulfonic acid, 4-aminonaphtalene-1-sulfonic acid, 5-aminonaphthalene-1sulfonic acid, 6-aminonaphthalene-1-sulfonic acid, 7-aminonaphthalene-1sulfonic acid, 8-aminonaphthalene-1-sulfonic acid, 1-aminonapthalene-2-sulfonic acid, 4-aminonapthalene-2-sulfonic acid, 5-aminonaphthalene-2-sulfonic acid, 6-aminonaphthalene-2-sulfonic acid, 7-aminonaphthalene-2-sulfonic acid, 7-methylaminonaphthalene-2sulfonic acid, 7-ethylaminonaphthalene-2-sulfonic acid, 7-butylaminonaphthalene-2sulfonic acid, 7-isobutylaminonaphthalene-2-sulfonic acid, 8-aminonaphthalene-2-sulfonic acid, 4-aminonaphthalene-1,3-disulfonic acid, 5-aminonaphthalene-1,3-disulfonic acid, 6-aminonaphthalene-1,3-disulfonic acid, 7-aminonaphthalene-1,3-disulfonic aicd, 8-aminonaphthalene-1,3-disulfonic acid, 2-aminonaphthalene-1,5-disulfonic acid, 3-aminonaphthalene-1,5-disulfonic acid, 4aminonaphthalene-1,5-disulfonic acid, 4-aminonaphthalene-1,6-disulfonic acid, 8-aminonaphthalene-1,6-disulfonic acid, 4-aminonaphthalene-1,7-disulfonic acid, 3-aminonaphthalene-2,6-disulfonic acid, 4-aminonaphthalene-2,6-disulfonic acid, 3-aminonaphthalene-2,7-disulfonic acid, 4-aminonaphthalene-2,7-disulfonic acid, 6-aminonaphthalene-1,3,5-trisulfonic acid, 7-aminonaphthalene-1,3,5-trisulfonic acid, 4-aminonaphthalene-1,3,6-trisulfonic acid, 7-aminonaphthalene-1,3,6-trisulfonic acid, 8-aminonaphthalene-1,3,6-trisulfonic acid, 4-aminonaphthalene-1,3,7-trisulfonic acid and the like.

Examples of the aliphatic amines are methylamine, ethylamine, n-propylamine, iso-propylamine, n-butylamine, iso-butylamine, sec-butylamine, dimethylamine, diethylamine, methylethylamine, allylamine, 2-chloroethylamine, 2-methoxyethylamine, 2-aminoethanol, 2-methylaminoethanol, bis-(2-hydroxyethyl-amine, 2-acetylaminoethylamine, 1-amino-2-propanol, 3-methoxypropylamine, 1-amino-3-dimethylaminopropane, 2aminoethanesulfonic acid, aminomethanesulfonic acid, 2-methylaminoethanesulfonic acid, 3-amino-1-propanesulfonic acid, 2-sulfatoethylamine, aminoacetic acid, methylaminoacetic acid, ε-aminocaproic acid, benzylamine, 2-, 3- or 4-chlorobenzylamine, 4-methylbenzylamine, N-methylbenzylamine, 2-, 3- or 4-sulfobenzylamine, 2phenylethylamine, 1-phenylethylamine, 1-phenyl-2-propylamine and the like.

Examples of the lower alcohols are methanol, ethanol, n-propanol, iso-propanol, n-butanol, iso-butanol and the like.

Examples of the substituted phenols are 3- or 4-sulfophenol, 2,4- or 3,5-disulfophenol, 2-nitro-4-sulfophenol, 2-chloro-4-sulfophenol and the like.

Of these compounds exemplified for the compound of the formula (VIII), particularly preferred are, for example, aniline, N-methylaminobenzene, N-ethylaminobenzene, 3-aminobenzenesulfonic acid, 3-methylaminobenzenesulfonic acid, 3-ethylaminobenzenesulfonic acid, 4-aminobenzenesulfonic acid, 4-methylaminobenzene sulfonic acid, 4-ethylaminobenzenesulfonic acid, mono- or di-ethanolamine and the like.

Examples of the nitro compound (XI) are as follows:

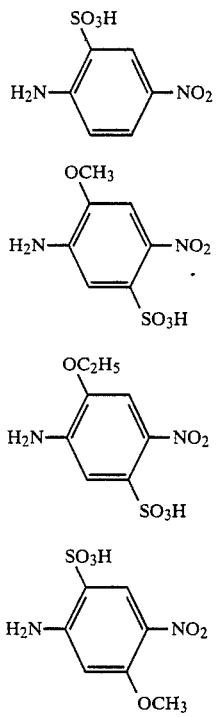

The monoazo compound (I) in accordance with the present invention is fiber-reactive and useful for dyeing or printing hydroxyl group-containing and amide group-containing materials. The materials are favorably in a fibrous form including unmixed or mixed fiber spinning.

The hydroxyl group-containing materials include natural or synthetic hydroxyl group-containing materials such as cellulose fiber materials, cellulose-containing fiber materials, regenerated products thereof and polyvinyl alcohol. Examples of the cellulose fiber materials are cotton and other vegetable fibers such as linen, hemp, jute and ramie fibers. Examples of the regenerated cellulose fibers are viscose staple and filament viscose. Examples of the cellulose-containing fiber materials are mixed fiber materials such as cellulose/polyester, cellulose/wook, cellulose/acryl and the like.

The amide group-containing materials, include sythethic or natural polyamide and polyurethane. Examples of the materials, particularly in the fibrous forms, are wool and other animal furs, silk, leather, polyamide-6,6, polyamide-6, polyamide-11 and polyamide-4.

The dyeing may be carried out in a suitable manner, which can be selected from conventional manners depending on the physical and chemical properties of said fiber materials.

For example, cellulose fiber materials can be dyed using the present compound by an exhaustion dyeing, padding including cold batch-up dyeing or printing method.

The exhaustion dyeing can be carried out at a relatively low temperature in the presence of an acid binding agent such as sodium carbonate, trisodium phosphate, sodium hydroxide and the like, if desired using a neutral salt such as sodium sulfate, sodium chloride and the like, optionally together with dissolving assistants, penetrants or level dyeing agents. The neutral salt which can be used for promoting exhaustion of the dye may be added to a dye bath at the time when a bath temperature reaches a level desired for the dyeing, or prior thereto. Alternatively, the neutral salt may be added thereto dividedly.

The padding can be carried out by padding the fiber materials at ambient temperature or an elevated temperature, and after drying, steaming or dry-heating the material to perform the dye-fixation.

The printing can be carried out in a one-phase or two-phase manner. The one-phase printing may be conducted by printing the fiber materials with a printing paste containing an acid binding agent such as sodium hyrogen carbonate and the like, followed by steaming at a temperature of 100° to 160° C. The two-phase printing may be conducted by printing the fiber materials with a neutral or weakly acidic printing paste, and passing the materials through a hot alkaline bath containing an electrolyte or over-padding the materials with an alkaline padding liquor containing an electrolyte, followed by a steaming or dry-heating treatment.

For the preparation of the printing paste, a paste or emulsifier such as sodium alginate, starch ether and the like may be used, if desired, together with a conventional auxiliary agent such as urea and/or a dispersing agent.

The acid binding agent useful for fixing the compound of the present invention on the cellulose fiber materials includes water-soluble basic salts consisting of alkali or alkaline earth metals and inorganic or organic acids or compounds capable of liberating alkalis under heating conditions. Preferred are alkali metal hydroxides and alkali metal salts of inorganic or organic acids having a weak or medium strength. Particularly preferred are sodium salts and potassium salts. Examples thereof are sodium hydroxide, potassium hydroxide, sodium hydrogen carbonate, sodium carbonate, sodium formate, potassium carbonate, sodium dihydrogen phosphate, disodium hydrogen phosphate, trisodium phosphate, sodium silicate, sodium trichloroacetate and the like.

The dyeing of natural or synthetic polyamide and polyurethane fiber materials can be carried out by performing exhausting in an acid or weak acid bath, while controlling the pH value, and then making the bath neutral, or in some cases alkaline to perform the fixation. The dyeing temperature ranges usually from 60° to 120° C. In order to achive a level dyeing, there may be used a conventional level dyeing agent such as a condensation product between cyanuric chloride and 3 times by mole of aminobenzene-sulfonic acid or aminonapthalenesulfonic acid, or an addition product between stearylamine and ethylene oxide, and the like.

The present monoazo compound (I) can be characterized by excellent dye performances in the dyeing and printing of fiber materials, particularly cellulose fiber materials. For example, the compound can give a dyed product excellent in light fastness, perspiration-light fastness, perspiration fastness, washing fastness, peroxide-washing fastness, chlorine fastness, chlorine bleaching fastness, acid-hydrolysis fastness, alkali fastness, abrasion fastness and iron fastness, particularly formalin fastness and formalin-light fastness. The monoazo compound (I) can also exhibit excellent build-up, level-dyeing and wash-off properties and high solubility as well as high exhaustion and fixation percentages. Moreover, the monoazo compound (I) can hardly be affected by changes in a dyeing temperature, a kind of alkali agents, an amount to be used of inorganic salts and dyeing bath ratio, so that a dyes product with a constant quality can be obtained with superior reproducibility. Furthermore, in the cold batch-up dyeing method, the monoazo compound (I) can exhibit characteristic features such that a build-up property and alkali stability including insusceptibility to hydrolysis by the alkali agents are excellent, and no difference in dyeing depth and color shade of dyed products can be observed in both cases where the fixing procedures are carried out at a relatively low temperature and at 25° C., respectively.

The present invention is illustrated in more detail with reference to the following Examples, which are only illustrative, but not limitative. In Examples, parts and % are by weight.

EXAMPLE 1

2,4-diaminobenzenesulfonic acid (18.8 parts) was added to a suspension prepared by dispersing cyanuric chloride (18.5 parts) in ice water (250 parts), and the mixture was stirred for 6 hours at 0° to 5° C., while controlling the pH within a range of 2 to 4 using a 20% aqueous solution of sodium carbonate, thereby performing a first condensation.

Into the resulting reaction mixture was added 1-aminobenzene-3-β-sulfatoethylsulfone (28.1 parts), and the mixture was stirred for 7 hours at 10° to 20° C., while controlling the pH within a range of 4 to 6 using a 20% aqueous solution of sodium carbonate, thereby performing a second condensation.

Successively, concentrated hydrochloric acid (25.3 parts) was added to the reaction mixture, and then a 35% aqueous solution of sodium nitrite (21.7 parts) was added thereto, thereby performing a diazotization. After an excess nitrous acid had been decomposed, 7-methylamino-1-naphthol-3-sulfonic acid (25.3 parts) was added, and the resulting mixture was stirred over night at 0° to 5° C., while controlling the pH within a range of 1 to 3 using a 20% aqueous solution of sodium carbonate, thereby performing a coupling reaction. Thereafter, the reaction mixture was heated to 40° C., adjusted to pH 4 to 6 and then subjected to salting out using sodium chloride (20 parts). The crystals produced were separated on a filter, washed and then dried at 60° C., thereby obtaining a monoazo compound represented by the following formula (1) in a free acid form.

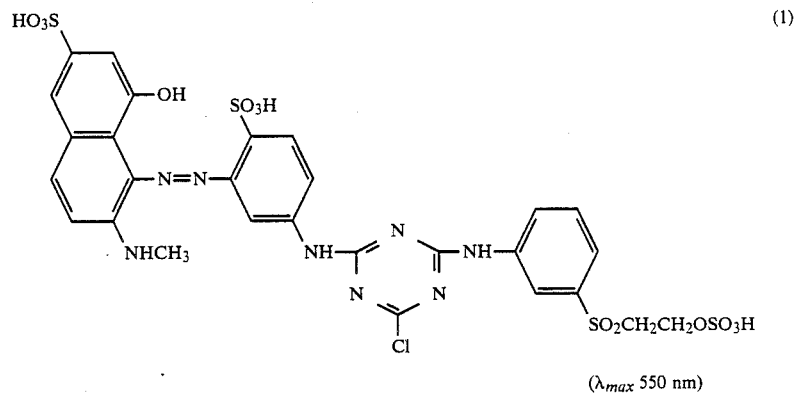

($\lambda_{max}$ 550 nm)

EXAMPLES 2 to 62

Example 1 was repeated, provided that each naphthol compound of the formula (V) shown in a second column in the following table was used in place of 7-methylamino-1-naphthol-3-sulfonic acid, and each diamine compound of the formula (II) shown in a third column in place of 2,4-diaminobenzenesulfonic acid, cyanuric chloric or cyanuric fluoride as shown in a fourth column in which Cl and F denote cyanuric chloride and cyanuric fluoride, respectively, and each aromatic amine compound of the formula (III) shown in a fifth column in place of 1-aminobenzene-3β-sulfatoethylsulfone, thereby obtaining each corresponding desired monoazo compound. The compound of the formula,

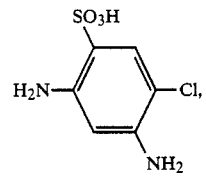

which was used in Examples 23 and 34, was prepared by acetylating the amino groups of 2,4-diaminobenzenesulfonic acid, followed by chlorination and hydrolysis.

| Example No. | Compound of Formula (V) | Compound of Formula (II) | Cyanuric chloride or fluoride | Compound of Formula (III) | Shade |
|---|---|---|---|---|---|
| 2 | HO, HO₃S, naphthalene-NH-phenyl-SO₃H | SO₃H, H₂N-phenyl-NH₂ | Cl | H₂N-phenyl-SO₂CH₂CH₂OSO₃H | Bluish red |
| 3 | " | " | " | CH₂CH₂CN, HN-phenyl-SO₂CH₂CH₂SSO₃H | Bluish red |

-continued
| Example No. | Compound of Formula (V) | Compound of Formula (II) | Cyanuric chloride or fluoride | Compound of Formula (III) | Shade |
|---|---|---|---|---|---|
| 4 | " | " | " | 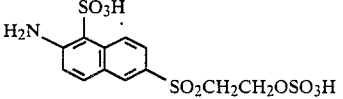 | Bluish red |
| 5 | " | 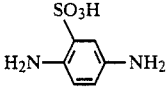 | " | 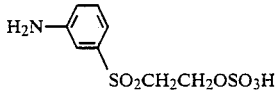 | Bluish red |
| 6 | " | " | " | 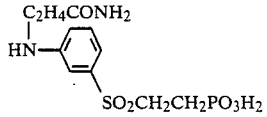 | Bluish red |
| 7 | " | " | F | 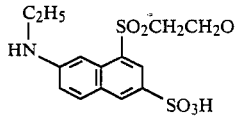 | Bluish red |
| 8 | " | 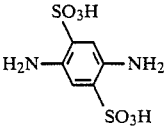 | Cl | 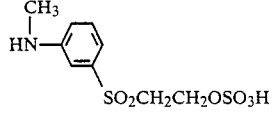 | Bluish red |
| 9 | " | " | " | 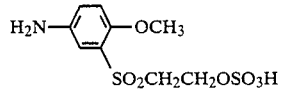 | Bluish red |
| 10 | " | 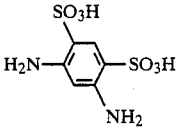 | " | 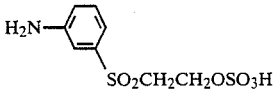 | Bluish red |
| 11 | " | " | " | 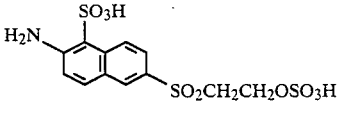 | Bluish red |
| 12 | " | " | F | 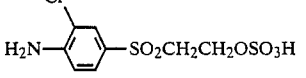 | Bluish red |
| 13 | " | 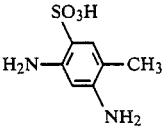 | " | 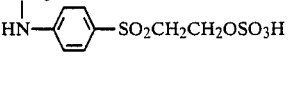 | Bluish red |
| 14 | " | " | Cl | 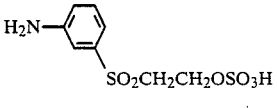 | Bluish red |
| 15 | " | 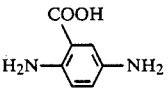 | " | " | Bluish red |

-continued

| Example No. | Compound of Formula (V) | Compound of Formula (II) | Cyanuric chloride or fluoride | Compound of Formula (III) | Shade |
|---|---|---|---|---|---|
| 16 | HO–naphthalene(NHPh)–SO$_3$H (4-hydroxy-6-sulfo-2-phenylamino-naphthalene) | 2,4-diamino-benzenesulfonic acid (H$_2$N–C$_6$H$_3$(SO$_3$H)–NH$_2$) | " | 3-H$_2$N–C$_6$H$_4$–SO$_2$CH$_2$CH$_2$OSO$_3$H | Bluish red |
| 17 | " | " | F | 2-amino-naphthalene-1-SO$_3$H, 6-SO$_2$CH$_2$CH$_2$OSO$_3$H | Bluish red |
| 18 | " | 4-amino-2-sulfo-N-methylaniline (H$_2$N–C$_6$H$_3$(SO$_3$H)–NH–CH$_3$) | Cl | 2-H$_2$N–C$_6$H$_3$(SO$_3$H)–SO$_2$CH$_2$CH$_2$OSO$_3$H | Bluish red |
| 19 | " | H$_2$N–C$_6$H$_3$(SO$_3$H)–NH$_2$ | " | C$_2$H$_5$HN–C$_6$H$_4$–SO$_2$CH$_2$CH$_2$OSO$_3$H | Bluish red |
| 20 | " | " | " | H$_2$N–naphthalene(SO$_2$CH$_2$CH$_2$OSO$_3$H)(SO$_3$H) | Bluish red |
| 21 | " | 2,4-diamino-benzoic acid (H$_2$N–C$_6$H$_3$(COOH)–NH$_2$) | " | " | Bluish red |
| 22 | HO–naphthalene(N(CH$_3$)COCH$_3$)–SO$_3$H | 4,6-diamino-benzene-1,3-disulfonic acid (H$_2$N–C$_6$H$_2$(SO$_3$H)$_2$–NH$_2$) | " | 2-amino-naphthalene-1-SO$_3$H, 6-SO$_2$CH$_2$CH$_2$OSO$_3$H | Bluish red |
| 23 | " | H$_2$N–C$_6$H$_2$(SO$_3$H)(Cl)–NH$_2$ | " | 3-H$_2$N–C$_6$H$_4$–SO$_2$CH$_2$CH$_2$OSO$_3$H | Bluish red |
| 24 | " | H$_2$N–C$_6$H$_2$(SO$_3$H)$_2$–NH$_2$ | " | " | Bluish red |
| 25 | HO–naphthalene(N(CH$_3$)$_2$)–SO$_3$H | H$_2$N–C$_6$H$_3$(SO$_3$H)–NH$_2$ | F | C$_2$H$_5$HN–naphthalene(SO$_2$CH$_2$CH$_2$OSO$_3$H)(SO$_3$H) | Bluish red |
| 26 | " | H$_2$N–C$_6$H$_2$(SO$_3$H)$_2$–NH$_2$ | Cl | 3-H$_2$N–C$_6$H$_4$–SO$_2$CH$_2$CH$_2$OSO$_3$H | Bluish red |
| 27 | " | H$_2$N–C$_6$H$_3$(SO$_3$H)–NH$_2$ | " | " | Bluish red |

-continued

| Example No. | Compound of Formula (V) | Compound of Formula (II) | Cyanuric chloride or fluoride | Compound of Formula (III) | Shade |
|---|---|---|---|---|---|
| 28 | HO–naphthalene–NHCH₃, HO₃S– substituent | 2,4-diaminobenzenesulfonic acid (SO₃H, H₂N, NH₂) | F | H₂N–naphthalene with SO₃H and SO₂CH₂CH₂OSO₃H | Bluish red |
| 29 | " | 2,5-diaminobenzenesulfonic acid (SO₃H, H₂N, NH₂) | " | " | Bluish red |
| 30 | HO–naphthalene–NHCH₃, HO₃S– | 2,5-diaminobenzenesulfonic acid | Cl | H₂N–C₆H₄–SO₂CH₂CH₂OSO₃H | Bluish red |
| 31 | " | 2,5-diaminobenzene-1,4-disulfonic acid (SO₃H, H₂N, SO₃H, NH₂) | " | " | Red |
| 32 | " | " | " | C₂H₅HN–naphthalene with SO₂CH₂CH₂OSO₃H and SO₃H | Red |
| 33 | " | 2,5-diaminobenzene-1,4-disulfonic acid (SO₃H, H₂N, NH₂, SO₃H) | " | H₂N–C₆H₂(OCH₃)₂–SO₂CH₂CH₂OSO₃H | Bluish red |
| 34 | " | 4-chloro-2,5-diaminobenzenesulfonic acid (SO₃H, H₂N, Cl, NH₂) | " | H₂N–C₆H₄–SO₂CH₂CH₂OSO₃H | Bluish red |
| 35 | " | 4-methyl-2,5-diaminobenzenesulfonic acid (SO₃H, H₂N, CH₃, NH₂) | " | " | Red |
| 36 | " | " | F | NC–CH₂CH₂–HN–C₆H₄–SO₂CH₂CH₂OSO₃H | Red |
| 37 | " | 2,5-diaminobenzoic acid (COOH, H₂N, NH₂) | " | " | Red |
| 38 | " | " | Cl | H₂N–naphthalene–SO₃H, SO₂CH₂CH₂OSO₃H | Red |
| 39 | HO–naphthalene–NHC₂H₅, HO₃S– | 2,4-diaminobenzenesulfonic acid (SO₃H, H₂N, NH₂) | " | C₂H₅HN–C₆H₄–SO₂CH₂CH₂OSO₃H | Red |

-continued

| Example No. | Compound of Formula (V) | Compound of Formula (II) | Cyanuric chloride or fluoride | Compound of Formula (III) | Shade |
|---|---|---|---|---|---|
| 40 | " | " | " | H₂N–C₆H₄–SO₂CH₂CH₂OSO₃H (meta) | Red |
| 41 | " | H₂N–C₆H₃(SO₃H)–NH₂ | " | " | Bluish red |
| 42 | " | " | " | 7-amino-1-(SO₂CH₂CH₂OSO₃H)-naphthalene | Bluish red |
| 43 | " | H₂N–C₆H₂(SO₃H)₂–NH₂ | " | " | Red |
| 44 | " | " | " | H₂N–C₆H₄–SO₂CH₂CH₂OSO₃H (meta) | Red |
| 45 | " | H₂N–C₆H₂(SO₃H)₂–NH₂ | F | 2-amino-1-SO₃H-6-(SO₂CH₂CH₂OSO₃H)-naphthalene | Bluish red |
| 46 | " | " | Cl | H₂N–C₆H₄–SO₂CH₂CH₂OSO₃H (meta) | Bluish red |
| 47 | " | H₂N–C₆H₂(SO₃H)(CH₃)–NH₂ | " | " | Red |
| 48 | 7-(N(C₂H₅)₂)-1-hydroxy-3-sulfo-naphthalene | " | F | H₂N–C₆H(OCH₃)₂–SO₂CH₂CH₂OSO₃H | Red |
| 49 | " | H₂N–C₆H₃(SO₃H)–NH₂ | Cl | H₂N–C₆H₄–SO₂CH₂CH₂OSO₃H (meta) | Red |
| 50 | " | H₂N–C₆H₂(SO₃H)₂–NH₂ | " | 2-amino-1-SO₃H-6-(SO₂CH₂CH₂OSO₃H)-naphthalene | Red |
| 51 | 7-(NHCH₂CH₂CH₃)-1-hydroxy-3-sulfo-naphthalene | H₂N–C₆H₃(SO₃H)–NH₂ | " | 7-amino-1-(SO₂CH₂CH₂OSO₃H)-3-SO₃H-naphthalene | Red |

-continued

| Example No. | Compound of Formula (V) | Compound of Formula (II) | Cyanuric chloride or fluoride | Compound of Formula (III) | Shade |
|---|---|---|---|---|---|
| 52 | " | " | " | 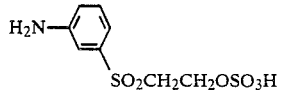 | Red |
| 53 | " | 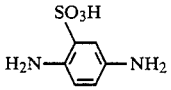 | " | " | Bluish red |
| 54 | " | " | " | 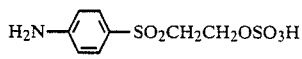 | Bluish red |
| 55 | " | 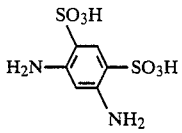 | " | " | Red |
| 56 | " | " | " | 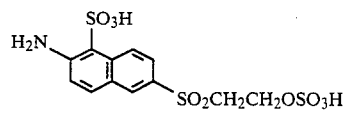 | Red |
| 57 | " | 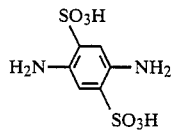 | F |  | Bluish red |
| 58 | " | 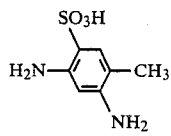 | Cl | " | Red |
| 59 | " | " | " | 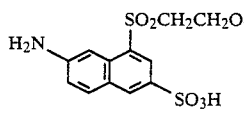 | Red |
| 60 | " | 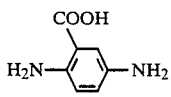 | " | " | Red |
| 61 | 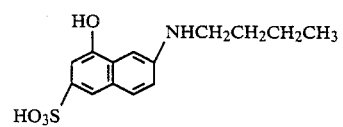 | 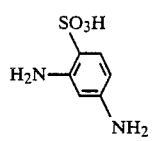 | " |  | Red |
| 62 | " | 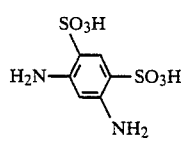 | " | " | Red |

EXAMPLE 63

A solution containing 2-methoxy-4-nitroaniline-5-sulfonic acid (24.8 parts) and a 35% aqueous solution of sodium nitrite (21.7 parts) in water (150 parts) was introduced into a solution containing ice water (300 parts) and concentrated hydrochloric acid (35.5 parts), while controlling the temperature to 0° to 5° C., and the mixture was stirred for 1 hour at this temperature to perform a diazotization.

Successively, after an excess nitrous acid had been decomposed, 7-ethylamino-1-naphthol-3-sulfonic acid (26.7 parts) was added to the reaction mixture, and the mixture was stirred for 2 hours at 0° to 5° C., while controlling the pH within a range of 1 to 3 using a 20% aqueous solution of sodium carbonate, thereby performing a coupling reaction. Thereafter, the reaction mixture was adjusted to pH 8 to 10, and mixed with sodium sulfide (10.7 parts), and the mixture was heated to 60° C. and stirred for 3 hours at this temperature to perform a reduction. Then, the reaction mixture was mixed with sodium chlolride (40 parts) to deposit crystals, which were collected on a filter and washed. The resulting wet cake was dissolved in water (400 parts). The solution was mixed with cyanuric chloride (16.7 parts), and the mixture was stirred for 5 hours at 0° to 10° C., while controlling the pH within a range of 2 to 3 using a 20% aqueous solution of sodium carbonate, thereby performing a first condensation. To this reaction mixture was added 2-aminonaphthalene-6-β-sulfatoethylsulfone-1-sulfonic acid (37 parts), and the mixture was stirred for 15 at 20° to 30° C., while controlling the pH within a range of 4 to 5 using a 20% aqueous solution of sodium carbonate, thereby performing a second condensation. Thereafter, the reaction mixture was mixed with sodium chloride (40 parts) to deposit crystals, which were collected on a filter, washed and dried at 60° C. to obtain a desired monoazo compound represented by the following formula (63) in a free acid form.

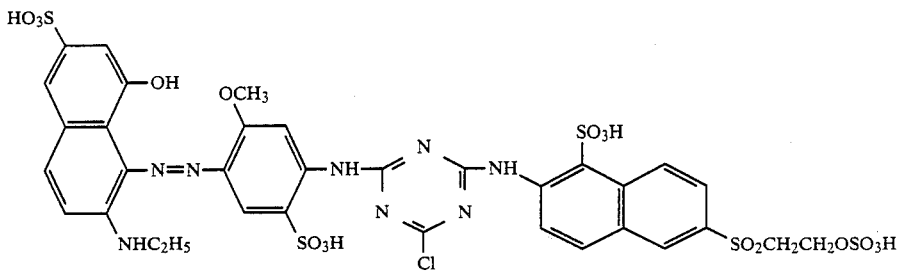

(63)

($\lambda_{max}$ 560 nm)

EXAMPLES 64 to 86

Example 63 was repeated, provided that each naphtol compound of the formula (V) shown in a second column of the following table was used in place of 7-ethylamino-1-naphthol-3-sulfonic acid, and each compound of the formula (IX) shown in a third column in place of 2-methoxy-4-nitroaniline-5-sulfonic acid, cyanuric chloride or cyanuric fluoride as shown in a fourth column in which Cl and F denote cyanuric chloride and cyanuric fluoride, respectively, and each aromatic amine compound of the formula (III) shown in a fifth column in place of 2-aminonaphthalene-6-β-sulfatoethyl -sulfone-1-sulfonic acid, thereby obtaining the desired corresponding monoazo compound.

| Example No. | Compound of Formula (V) | Compound of Formula (IX) | Cyanuric chloride or fluoride | Compound of Formula (III) | Shade |
|---|---|---|---|---|---|
| 64 | [structure] | [structure] | Cl | [structure] | Bluish red |
| 65 | [structure] | [structure] | Cl | [structure] | Bluish red |
| 66 | [structure] | [structure] | Cl | [structure] | Bluish red |
| 67 | [structure] | [structure] | Cl | [structure] | Bluish red |
| 68 | [structure] | [structure] | Cl | [structure] | Bluish red |

| Example No. | Compound of Formula (V) | Compound of Formula (IX) | Cyanuric chloride or fluoride | Compound of Formula (III) | Shade |
|---|---|---|---|---|---|
| 69 | 1-hydroxy-6-sulfo-naphthalen-2-yl-NH-(3-sulfophenyl) | 4-amino-5-methoxy-2-nitrobenzene sulfonic acid ($H_2N$, $NO_2$, $OCH_3$, $SO_3H$) | F | $C_2H_5$-NH-C$_6$H$_4$-SO$_2$CH$_2$CH$_2$OSO$_3$H | Bluish red |
| 70 | 1-hydroxy-6-sulfo-naphthalen-2-yl-NH-phenyl | $H_2N$, $OCH_3$, $NO_2$, $SO_3H$ benzene | Cl | 2-amino-1-sulfo-6-(β-sulfatoethylsulfonyl)naphthalene | Bluish red |
| 71 | 1-hydroxy-6-sulfo-naphthalen-2-yl-NH-phenyl | $H_2N$, $OCH_3$, $NO_2$, $SO_3H$ benzene | Cl | 3-amino-phenyl-SO$_2$CH$_2$CH$_2$OSO$_3$H | Bluish red |
| 72 | 1-hydroxy-6-sulfo-naphthalen-2-yl-NH-phenyl | $H_2N$, $OC_2H_5$, $NO_2$, $SO_3H$ benzene | Cl | 3-amino-phenyl-SO$_2$CH$_2$CH$_2$OSO$_3$H | Bluish red |
| 73 | 1-hydroxy-6-sulfo-naphthalen-2-yl-NH-phenyl | $H_2N$, $OC_2H_5$, $NO_2$, $SO_3H$ benzene | F | NC-CH$_2$CH$_2$-NH-C$_6$H$_4$-SO$_2$CH$_2$CH$_2$OSO$_3$H | Bluish red |
| 74 | 1-hydroxy-6-sulfo-naphthalen-2-yl-NH-phenyl | $H_2N$, $SO_3H$, $NO_2$, $OCH_3$ benzene | F | NC-CH$_2$CH$_2$-NH-C$_6$H$_4$-SO$_2$CH$_2$CH$_2$OSO$_3$H | Bluish red |
| 75 | 1-hydroxy-6-sulfo-naphthalen-2-yl-NH-phenyl | $H_2N$, $SO_3H$, $NO_2$, $OCH_3$ benzene | Cl | NC-CH$_2$CH$_2$-NH-C$_6$H$_4$-SO$_2$CH$_2$CH$_2$OSO$_3$H | Bluish red |
| 76 | 1-hydroxy-6-sulfo-naphthalen-2-yl-NHCH$_3$ | $H_2N$, $OCH_3$, $NO_2$, $SO_3H$ benzene | Cl | 2-amino-1-sulfo-6-(β-sulfatoethylsulfonyl)naphthalene | Bluish red |
| 77 | 1-hydroxy-6-sulfo-naphthalen-2-yl-NHCH$_3$ | $H_2N$, $OCH_3$, $NO_2$, $SO_3H$ benzene | Cl | 3-amino-phenyl-SO$_2$CH$_2$CH$_2$OSO$_3$H | Bluish red |
| 78 | 1-hydroxy-6-sulfo-naphthalen-2-yl-NHCH$_3$ | $H_2N$, $OC_2H_5$, $NO_2$, $SO_3H$ benzene | Cl | 3-amino-phenyl-SO$_2$CH$_2$CH$_2$OSO$_3$H | Bluish red |
| 79 | 1-hydroxy-6-sulfo-naphthalen-2-yl-N(CH$_3$)$_2$ | $H_2N$, $OC_2H_5$, $NO_2$, $SO_3H$ benzene | Cl | 4-amino-phenyl-SO$_2$CH$_2$CH$_2$OSO$_3$H | Bluish red |

| Example No. | Compound of Formula (V) | Compound of Formula (IX) | Cyanuric chloride or fluoride | Compound of Formula (III) | Shade |
|---|---|---|---|---|---|
| 80 | HO-naphthalene-N(CH$_3$)$_2$, HO$_3$S- | OCH$_3$, H$_2$N-, NO$_2$, SO$_3$H | Cl | H$_2$N—C$_6$H$_4$—SO$_2$CH$_2$CH$_2$OSO$_3$H | Bluish red |
| 81 | HO-naphthalene-N(CH$_3$)$_2$, HO$_3$S- | OCH$_3$, H$_2$N-, NO$_2$, SO$_3$H | Cl | naphthalene with NHC$_2$H$_5$, SO$_2$CH$_2$CH$_2$OSO$_3$H, SO$_3$H | Bluish red |
| 82 | HO-naphthalene-NHC$_2$H$_5$, HO$_3$S- | OCH$_3$, H$_2$N-, NO$_2$, SO$_3$H | Cl | H$_2$N—C$_6$H$_4$—SO$_2$CH$_2$CH$_2$OSO$_3$H | Bluish red |
| 83 | HO-naphthalene-NHC$_2$H$_5$, HO$_3$S- | OC$_2$H$_5$, H$_2$N-, NO$_2$, SO$_3$H | F | H$_2$N—C$_6$H$_4$—SO$_2$CH$_2$CH$_2$OSO$_3$H | Bluish red |
| 84 | HO-naphthalene-NHC$_2$H$_5$, HO$_3$S- | SO$_3$H, H$_2$N-, NO$_2$, OCH$_3$ | F | H$_2$N—C$_6$H$_4$—SO$_2$CH$_2$CH$_2$OSO$_3$H | Bluish red |
| 85 | HO-naphthalene-NHCH$_2$CH$_2$CH$_3$, HO$_3$S- | SO$_3$H, H$_2$N-, NO$_2$, OCH$_3$ | Cl | H$_2$N—C$_6$H$_4$—SO$_2$CH$_2$CH$_2$OSO$_3$H | Bluish red |
| 86 | HO-naphthalene-NHCH$_2$CH$_2$CH$_3$, HO$_3$S- | OCH$_3$, H$_2$N-, NO$_2$, SO$_3$H | Cl | H$_2$N—C$_6$H$_4$—SO$_2$CH$_2$CH$_2$OSO$_3$H | Bluish red |

EXAMPLE 87

The monoazo compound (98.7 parts) represented by the following formula in free acid form,

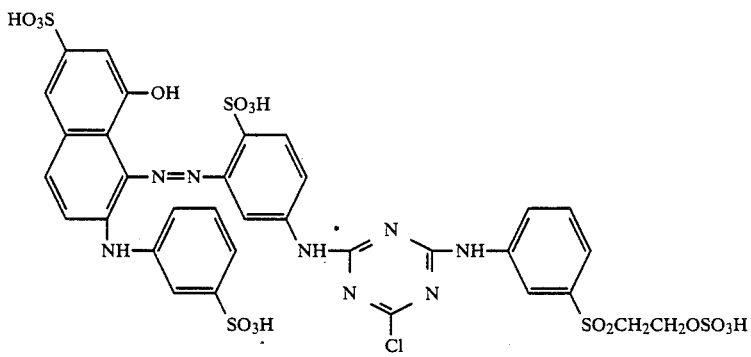

which had been obtained in Example 2, was dissolved in water (500 parts), and to this solution was added 3-aminobenzenesulfonic acid (34.6 parts). The mixture was heated up to 80° to 85° C., while controlling the pH within a range of 4 to 6 using a 20% aqueous sodium carbonate solution, and then stirred for 7 hours at that temperature and that pH. Thereafter, the reaction mixture was mixed with sodium chloride (45 parts) to deposit crystals, which were collected on a filter, washed and dried at 60° C. to obtain a monoazo compound of the following formula (87) in a free acid form.

(87)

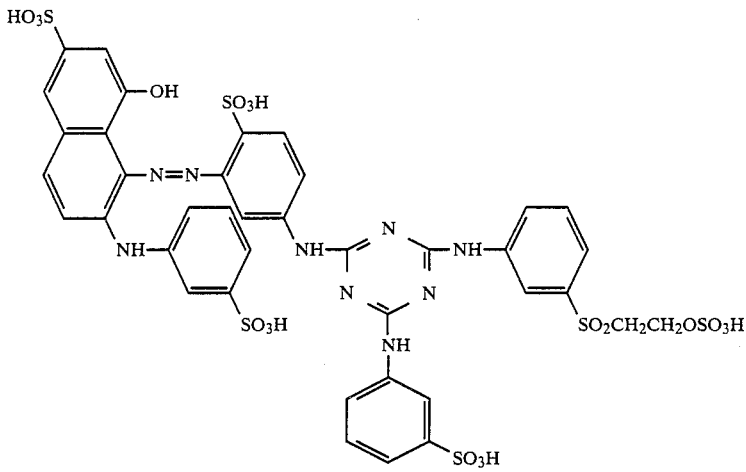

($\lambda_{max}$ 540 nm)

EXAMPLE 88 to 119

Example 87 was repeated, provided that each monoazo compound shown below was used in place of the monoazo compound obtained in Example 2, the monoazo compound used being shown in a second column of the following table (in which the monoazo compound used is expressed in terms of each Example No.), and each compound of the formula (VIII) in place of 3-amino-benzenesulfonic acid, thereby obtaining the corresponding desired monoazo compound.

| Example No. | Example No. of Monoazo compound obtained | Compound of Formula (VIII) | Shade |
|---|---|---|---|
| 88 | 1 | H₂N—⟨⟩—SO₃H (3-) | Bluish red |
| 89 | 4 | H₂N—⟨⟩—SO₃H | Bluish red |
| 90 | 5 | NH(CH₂CH₂OH)₂ | Bluish red |
| 91 | 8 | CH₃ \| HNCH₂CH₂SO₃H | Bluish red |
| 92 | 10 | H₂N—⟨⟩—SO₃H | Bluish red |
| 93 | 14 | H₂N—⟨⟩—SO₃H | Bluish red |
| 94 | 16 | H₂N—⟨⟩—SO₃H | Bluish red |
| 95 | 20 | H₂N—⟨⟩(SO₃H)₂ | Bluish red |
| 96 | 21 | 8-amino-naphthalene-6-SO₃H (NH₂, SO₃H on naphthalene) | Bluish red |
| 97 | 22 | H₂N-naphthalene-(SO₃H)₂ | Bluish red |
| 98 | 24 | HO—⟨⟩ | Bluish red |
| 99 | 27 | H₂N—⟨⟩—SO₃H | Bluish red |
| 100 | 28 | H₂N—⟨⟩—SO₃H | Bluish red |
| 101 | 30 | H₂N—⟨⟩—SO₃H | Bluish red |
| 102 | 31 | H₂N—⟨⟩—SO₃H (2-) | Red |
| 103 | 35 | NH₂(CH₂CH₂OH) | Red |

-continued

| Example No. | Example No. of Monoazo compound obtained | Compound of Formula (VIII) | Shade |
|---|---|---|---|
| 104 | 40 | HN(CH₃)—C₆H₄—SO₃H (meta) | Red |
| 105 | 41 | H₂N—C₆H₄—SO₃H (para) | Bluish red |
| 106 | 44 | H₂NCH₂—C₆H₅ | Red |
| 107 | 47 | H₂N—C₆H₃(SO₃H)₂ | Red |
| 108 | 63 | H₂NCH₃ | Bluish red |
| 109 | 84 | H₂N—C₆H₄—SO₃H | Bluish red |
| 110 | 66 | H₂N—C₆H₄—SO₃H | Bluish red |
| 111 | 69 | H₂N—naphthyl(SO₃H)₂ | Bluish red |
| 112 | 71 | H₂NCH₂CH₂OSO₃H | Bluish red |
| 113 | 72 | H₂NCH₂CH₂OCH₃ | Bluish red |
| 114 | 77 | H₂N—naphthyl(SO₃H)₃ | Bluish red |
| 115 | 80 | HN(CH₃)—naphthyl—SO₃H | Bluish red |
| 116 | 82 | H₂N—C₆H₅ | Bluish red |
| 117 | 83 | HN(C₂H₅)—C₆H₅ | Bluish red |
| 118 | 84 | HN(CH₃)—C₆H₄—SO₃H | Bluish red |
| 119 | 86 | HN(CH₃)—C₆H₄—SO₃H | Bluish red |

EXAMPLE 120

A 35% aqueous solution of sodium nitrite (21.7 parts) was added to a solution containing 2-amino-5-aminomethylnaphthalene-1-sulfonic acid (27.4 parts) and concentrated hydrochloric acid (35.5 parts) in ice water (300 parts), while controlling the temperature within a range of 0° to 5° C., and the mixture was stirred for 1 hour at that temperature to perform a diazotization. Successively after an excess nitrous acid had been decomposed, 7-ethylamino-1-naphthol-3-sulfonic acid (26.7 parts) was added thereto, and the mixture was stirred for 12 hours at 0° to 5° C., while controlling the pH within a range of 3 to 5 using a 20% aqueous solution of sodium carbonate, thereby performing a coupling reaction to obtain a monoazo compound-containing solution.

On the other hand, water (30 parts) and sodium carbonate (8.4 parts) were added to methanol (300 parts), and cyanuric chloride (18.5 parts) was further added thereto. The mixture was stirred for 30 minutes at 0° to 10° C. The resulting reaction mixture was added to the above monoazo compound-containing solution, and the mixture was stirred for 6 hours at 30° to 40° C., while controlling the pH within a range of 7 to 8 using a 20% aqueous solution of sodium carbonate.

Moreover, 1-ethylaminobenzene-4-β-sulfatoethyl-sulfone (30.9 parts) was added to the above reaction mixture, and the resulting mixture was heated upto 80° 90° C., while controlling the pH within a range of 3 to 5 using a 20% aqueous solution of sodium carbonate, and then stirred for 15 hours at that temperature and that pH. Thereafter, the reaction mixture was cooled to 40° C. and mixed with sodium chloride (40 parts) to deposit crystals, which were collected on a filter, washed and dried at 60° C. to obtain a monoazo compound of the following formula (120) in a free acid form.

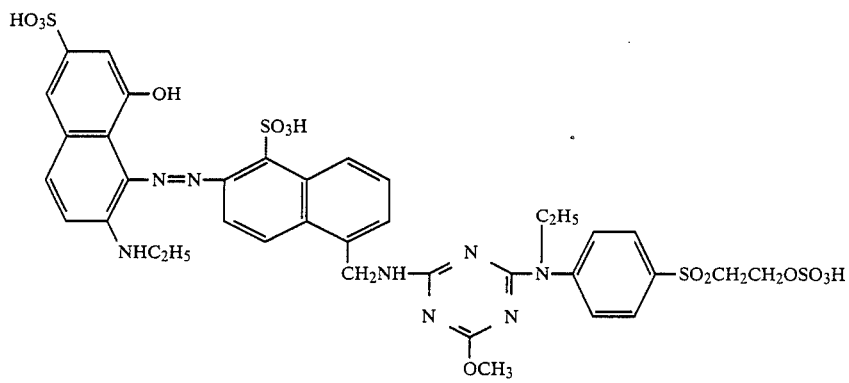

(120)

($\lambda_{max}$ 560 nm)

EXAMPLES 121 to 141

Example 120 was repeated, provide that each diamine compound of the formula (II) shown in a third colunm of the following table was used in place of 2-amino-5-aminomethylnaphthalene-1-sulfonic acid, each naphthol compound of the formula (V) shown in a second column in place of 7-ethylamino-1-naphthol-3-sulfonic acid, each compound of the formula (VIII) shown in fourth column in place of methanol, and each aromatic amine compound of the formula (III) shown in a fifth column in place of 1-ethylaminobenzene-4-β-sulfatoethylsulfone, thereby obtaining the corresponding desired monoazo compound.

| Example No. | Compound of Formula (V) | Compound of Formula (II) | Compound of Formula (VIII) | Compound of Formula (III) | Shade |
|---|---|---|---|---|---|
| 121 | 8-hydroxy-6-sulfo-2-(3-sulfophenylamino)naphthalene | 2,8-diamino-4-(aminomethyl)naphthalene-6-sulfonic acid (H₂N, SO₃H, SO₃H, CH₂NH₂) | C₂H₅OH | N-ethyl-4-(β-sulfatoethylsulfonyl)aniline | Bluish red |
| 122 | 8-hydroxy-6-sulfo-2-(3-sulfophenylamino)naphthalene | 1,4-diamino-2,5-disulfobenzene | C₂H₅OH | 2-amino-6-(β-sulfatoethylsulfonyl)naphthalene-1-sulfonic acid | Bluish red |
| 123 | 8-hydroxy-6-sulfo-2-(3-sulfophenylamino)naphthalene | 1,4-diamino-2,5-disulfobenzene | CH₃CH₂CH₂OH | 2-amino-6-(β-sulfatoethylsulfonyl)naphthalene-1-sulfonic acid | Bluish red |
| 124 | 8-hydroxy-6-sulfo-2-methylaminonaphthalene | 2,8-diamino-4-(aminomethyl)naphthalene-1-sulfonic acid | CH₃OH | 3-(β-sulfatoethylsulfonyl)aniline | Red |
| 125 | 8-hydroxy-6-sulfo-2-methylaminonaphthalene | 1,4-diamino-2,5-disulfobenzene | CH₃OH | 3-(β-sulfatoethylsulfonyl)aniline | Red |
| 126 | 8-hydroxy-6-sulfo-2-methylaminonaphthalene | 1,4-diamino-2,5-disulfobenzene | CH₃OH | 2-amino-6-(β-sulfatoethylsulfonyl)naphthalene-1-sulfonic acid | Yellowish red |

-continued

| Example No. | Compound of Formula (V) | Compound of Formula (II) | Compound of Formula (VIII) | Compound of Formula (III) | Shade |
|---|---|---|---|---|---|
| 127 | 5-HO, 7-NHC₂H₅, 3-HO₃S naphthalene | 2,5-diamino-1,4-benzenedisulfonic acid (SO₃H, H₂N, SO₃H, NH₂) | CH₃OH | 2-amino-6-(β-sulfatoethylsulfonyl) naphthalene-1-sulfonic acid | Yellowish red |
| 128 | 5-HO, 7-NHC₂H₅, 3-HO₃S naphthalene | 2,4-diamino-1,5-benzenedisulfonic acid | C₂H₅OH | 2-methoxy-5-(β-sulfatoethylsulfonyl) aniline | Red |
| 129 | 5-HO, 7-NHC₂H₅, 3-HO₃S naphthalene | 2,4-diamino-1,5-benzenedisulfonic acid | CH₃OH | 2-methoxy-5-methyl-4-(β-sulfatoethylsulfonyl) aniline | Red |
| 130 | 5-HO, 7-NHCH₂CH₂CH₃, 3-HO₃S naphthalene | 2,5-diamino-1,4-benzenedisulfonic acid | CH₃CH₂CH₂OH | 3-(β-sulfatoethylsulfonyl) aniline | Yellowish red |
| 131 | 5-HO, 7-NHCH₂CH₂CH₃, 3-HO₃S naphthalene | 2,5-diamino-1,4-benzenedisulfonic acid | CH₃OH | 3-(β-sulfatoethylsulfonyl) aniline | Yellowish red |
| 132 | 5-HO, 7-NHCH₂CH₂CH₃, 3-HO₃S naphthalene | 8-amino-5-aminomethyl-naphthalene-1,6-disulfonic acid (H₂N, SO₃H, SO₃H, CH₂NH₂) | CH₃OH | 3-(β-sulfatoethylsulfonyl) aniline | Red |
| 133 | 5-HO, 7-N(CH₃)₂, 3-HO₃S naphthalene | 8-amino-5-aminomethyl-naphthalene-1,6-disulfonic acid | CH₃OH | 3-(β-sulfatoethylsulfonyl) aniline | Red |
| 134 | 5-HO, 7-N(CH₃)₂, 3-HO₃S naphthalene | 2,5-diamino-1,4-benzenedisulfonic acid | CH₃OH | 7-amino-1-(β-sulfatoethylsulfonyl)-naphthalene-3-sulfonic acid | Yellowish red |
| 135 | 5-HO, 7-N(CH₃)₂, 3-HO₃S naphthalene | 2,5-diamino-1,4-benzenedisulfonic acid | C₂H₅OH | 7-amino-1-(β-sulfatoethylsulfonyl)-naphthalene-3-sulfonic acid | Yellowish red |
| 136 | 5-HO, 7-N(C₂H₅)₂, 3-HO₃S naphthalene | 2,5-diamino-1,4-benzenedisulfonic acid | CH₃OH | N-methyl-4-(β-sulfatoethylsulfonyl) aniline | Yellowish red |

| Example No. | Compound of Formula (V) | Compound of Formula (II) | Compound of Formula (VIII) | Compound of Formula (III) | Shade |
|---|---|---|---|---|---|
| 137 | HO-naphthol-SO3H with NH(C2H5)2 substituent | 1,4-diamino-2,5-disulfonic benzene | CH3OH | H2N-C6H4-SO2CH2CH2OSO3H | Yellowish red |
| 138 | HO-naphthol-SO3H with NH(C2H5)2 substituent | 2-amino-5-aminomethyl-naphthalene-1-sulfonic acid | CH3OH | H2N-C6H4-SO2CH2CH2OSO3H | Red |
| 139 | HO-naphthol-SO3H with NH-phenyl substituent | 2-amino-5-aminomethyl-naphthalene-1-sulfonic acid | CH3OH | H2N-C6H4-SO2CH2CH2OSO3H | Bluish red |
| 140 | HO-naphthol-SO3H with NH-phenyl substituent | 1,4-diamino-2,5-disulfonic benzene | (CH3)2CHOH | H2N-C6H4-SO2CH2CH2OSO3H | Bluish red |
| 141 | HO-naphthol-SO3H with NH-phenyl substituent | 1,4-diamino-2,5-disulfonic benzene | C2H5OH | H2N-naphthalene-SO2CH2CH2OSO3H, SO3H | Bluish red |

EXAMPLE 142

Example 1 was repeated, provided that 2-methylamino-8-hydroxynaphtalene-3,6-disulfonic acid (33.3 parts) was used in placed of 7-methylamino-1-naphthol-3-sulfonic acid (25.3 parts), thereby obtaining a desired monoazo compound of the following formula (142) in a free acid form.

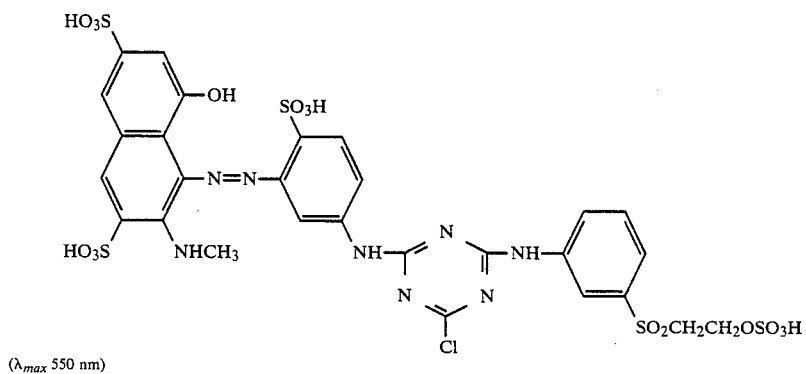

(142)

($\lambda_{max}$ 550 nm)

EXAMPLES 143 to 196

Example 1 was repeated, provided that each naphthol compound of the formula (V) shown in a second column of the following table was used in place of 7-methylamino-1-naphthol-3-sulfonic acid, each diamine compound of the formula (II) shown in a third column in place of 1, 3-diaminobenzene-4-sulfonic acid, cyanuric chloride or cyanuric fluoride as shown in a fourth column in which Cl and F denote cyanuric chloride and cyanuric fluoride, respectively, and each aromatic amine compound of the formula (III) shown in a fifth column in place of 1-aminobenzene-3-β-sulfatoethylsulfone, thereby obtaining the corresponding desired monoazo compounds.

| Example No. | Compound of Formula (V) | Compound of Formula (II) | Cyanuric chloride or fluoride | Compound of Formula (III) | Shade |
|---|---|---|---|---|---|
| 143 | naphthalene with NHCH₃, SO₃H, OH, HO₃S substituents | benzene with SO₃H, H₂N, NH₂ substituents | Cl | benzene with H₂N and SO₂CH=CH₂ substituents | Red |
| 144 | " | " | " | naphthalene with SO₃H, H₂N, SO₂CH₂CH₂OSO₃H substituents | " |
| 145 | " | benzene with SO₃H, H₂N, NH-CH₃ substituents | F | benzene with C₂H₅-HN and SO₂CH₂CH₂OSO₃H substituents | " |
| 146 | " | benzene with COOH, H₂N, NH₂ substituents | " | benzene with H₂N and SO₂CH₂CH₂OSO₃H substituents | Bluish red |
| 147 | naphthalene with NHCH₃, SO₃H, OH, HO₃S substituents | benzene with SO₃H, H₂N, NH₂ substituents | Cl | benzene with H₂N and SO₂CH₂CH₂OSO₃H substituents | Bluish red |
| 148 | " | " | " | naphthalene with SO₂CH₂CH₂OSO₃H, SO₃H, H₂N substituents | " |

-continued

| Example No. | Compound of Formula (V) | Compound of Formula (II) | Cyanuric chloride or fluoride | Compound of Formula (III) | Shade |
|---|---|---|---|---|---|
| 149 | (naphthalene with OH, HO$_3$S, N(CH$_3$)(COCH$_3$), SO$_3$H) | (benzene with SO$_3$H, NH$_2$, H$_2$N, SO$_3$H) | " | (naphthalene with SO$_3$H, H$_2$N, SO$_2$CH$_2$CH$_2$OSO$_3$H) | Red |
| 150 | " | " | F | (benzene with H$_2$N, SO$_2$CH$_2$CH$_2$OSO$_3$H) | " |
| 151 | (naphthalene with OH, HO$_3$S, N(CH$_3$)(COCH$_3$), SO$_3$H) | (benzene with Cl, NH$_2$, SO$_3$H, H$_2$N) | " | " | " |
| 152 | " | (benzene with Cl, NH$_2$, SO$_3$H, H$_2$N) | Cl | (benzene with CH$_3$–HN–, SO$_2$CH$_2$CH$_2$OSO$_3$H) | Red |
| 153 | " | (benzene with NH$_2$, SO$_3$H, H$_2$N, SO$_3$H) | " | " | Bluish red |
| 154 | " | " | " | (naphthalene with SO$_2$CH$_2$CH$_2$OSO$_3$H, C$_2$H$_5$–HN–) | " |

-continued

| Example No. | Compound of Formula (V) | Compound of Formula (II) | Cyanuric chloride or fluoride | Compound of Formula (III) | Shade |
|---|---|---|---|---|---|
| 155 | 5-hydroxy-6-(ethylamino)-naphthalene-1,3-disulfonic acid derivative (HO, NHC₂H₅, SO₃H, HO₃S on naphthalene) | 2,4-diaminobenzenesulfonic acid (H₂N, SO₃H, NH₂ on benzene) | | 2-amino-6-(β-sulfatoethylsulfonyl)-naphthalene-8-sulfonic acid (H₂N, SO₃H, SO₂CH₂CH₂OSO₃H on naphthalene) | Red |
| 156 | " | " | " | 3-(β-sulfatoethylsulfonyl)aniline (H₂N-C₆H₄-SO₂CH₂CH₂OSO₃H) | " |
| 157 | " | 2,4-diaminobenzenesulfonic acid (SO₃H, H₂N, NH₂) | Cl | 3-(β-sulfatoethylsulfonyl)aniline (H₂N-C₆H₄-SO₂CH₂CH₂OSO₃H) | Bluish red |
| 158 | " | 4-amino-2-aminobenzoic acid (COOH, H₂N, NH₂) | " | 2-amino-4-(β-sulfatoethylsulfonyl)-benzenesulfonic acid (SO₃H, H₂N, SO₂CH₂CH₂OSO₃H) | " |
| 159 | " | " | " | " | " |
| 160 | " | | " | N-ethyl-3-(β-sulfatoethylsulfonyl)aniline (C₂H₅-NH-C₆H₄-SO₂CH₂CH₂OSO₃H) | " |

-continued

| Example No. | Compound of Formula (V) | Compound of Formula (II) | Cyanuric chloride or fluoride | Compound of Formula (III) | Shade |
|---|---|---|---|---|---|
| 161 | ![HO, NHC₂H₅, SO₃H, HO₃S naphthalene] | ![SO₃H, NH₂, H₂N, SO₃H benzene] | " | ![H₂N, SO₃H, SO₂CH₂CH₂OSO₃H naphthalene] | Red |
| 162 | " | ![SO₃H, NH₂, H₂N, SO₃H benzene] | Cl | ![H₂N, SO₂CH₂CH₂OSO₃H benzene] | Red |
| 163 | " | ![CH₃, NH₂, H₂N, SO₃H benzene] | " | " | " |
| 164 | " | " | F | ![H₂N, SO₂CH₂CH₂OSO₃H, SO₃H naphthalene] | " |
| 165 | " | ![NH₂, SO₃H, H₂N, SO₃H benzene] | " | " | Bluish red |
| 166 | " | " | Cl | ![H₂N, SO₂CH₂CH₂OSO₃H benzene] | " |

-continued

| Example No. | Compound of Formula (V) | Compound of Formula (II) | Cyanuric chloride or fluoride | Compound of Formula (III) | Shade |
|---|---|---|---|---|---|
| 167 | naphthalene with HO, $HO_3S$, $NHCH_2CH_2CH_3$, $SO_3H$ | benzene with $SO_3H$, $H_2N$, $NH_2$ | Cl | naphthalene with $H_2N$, $SO_3H$, $SO_2CH_2CH_2OSO_3H$ | Red |
| 168 | " | " | " | benzene with $H_2N$, $SO_2CH_2CH_2OSO_3H$ | " |
| 169 | " | benzene with $SO_3H$, $H_2N$, $NH_2$ | " | " | Bluish red |
| 170 | " | benzene with COOH, $H_2N$, $NH_2$ | " | naphthalene with $H_2N$, $SO_3H$, $SO_2CH_2CH_2OSO_3H$ | " |
| 171 | " | benzene with $SO_3H$, $H_2N$, $NH_2$ | " | " | " |
| 172 | naphthalene with HO, $HO_3S$, $NHCH_2CH_2CH_3$, $SO_3H$ | " | F | benzene with $OCH_3$, $CH_3HN$, $SO_2CH_2CH_2OSO_3H$ | Bluish red |

-continued

| Example No. | Compound of Formula (V) | Compound of Formula (II) | Cyanuric chloride or fluoride | Compound of Formula (III) | Shade |
|---|---|---|---|---|---|
| 173 | " | 1,4-diamino-2-sulfo-5-sulfobenzene (H₂N, SO₃H, SO₃H, NH₂ substituted benzene) | Cl | 3-aminophenyl-SO₂CH₂CH₂OSO₃H | Red |
| 174 | " | " | " | 1-amino-8-sulfo-6-(SO₂CH₂CH₂OSO₃H)-naphthalene | " |
| 175 | " | 1,4-diamino-2,5-disulfobenzene | " | " | Bluish red |
| 176 | 3-(NHCH₂CH₂CH₃)-6-sulfo-8-hydroxy-naphthalene with SO₃H | " | " | " | " |
| 177 | " | 4-amino-2-methyl-5-amino-sulfobenzene (CH₃, NH₂, SO₃H, H₂N substituted) | Cl | 3-aminophenyl-SO₂CH₂CH₂OSO₃H | Red |
| 178 | " | " | " | 2-(N-ethylamino)-8-(SO₂CH₂CH₂OSO₃H)-naphthalene | " |

| Example No. | Compound of Formula (V) | Compound of Formula (II) | Cyanuric chloride or fluoride | Compound of Formula (III) | Shade |
|---|---|---|---|---|---|
| 179 | HO-naphthalene-SO₃H with NHCH₂CH₂CH₂—CH₃ and SO₃H | H₂N-C₆H₃(SO₃H)-NH₂ | " | C₆H₄(NH-C₂H₄CN)-SO₂CH₂CH₂OSOCH₃ | " |
| 180 | " | H₂N-C₆H₃(SO₃H)-NH₂ | " | C₆H₄(NH-C₂H₄COOH)-SO₂CH₂CH₂SSO₃H | Bluish red |
| 181 | " | H₂N-C₆H₃(COOH)-NH₂ | F | C₆H₄(NH-C₂H₄CONH₂)-SO₂CH₂CH₂OPO₃H₂ | " |
| 182 | HO-naphthalene-SO₃H with NHCH₂CH₂CH₂—CH₃ and SO₃H | H₂N-C₆H₂(SO₃H)₂-NH₂ | Cl | H₂N-C₆H₂(OCH₃)(CH₃)-SO₂CH₂CH₂OSO₃H | Red |
| 183 | " | H₂N-C₆H₂(SO₃H)(CH₃)-NH₂ | " | H₂N-C₆H₃(OCH₃)-SO₂CH₂CH₂OSO₃H | " |

-continued

| Example No. | Compound of Formula (V) | Compound of Formula (II) | Cyanuric chloride or fluoride | Compound of Formula (III) | Shade |
|---|---|---|---|---|---|
| 184 | " | $H_2N$-C₆H₃(SO₃H)₂-NH₂ | F | 3-Cl-4-$H_2N$-C₆H₃-$SO_2CH_2CH_2OSO_3H$ | Bluish red |
| 185 | 8-hydroxy-3-(N,N-dimethylamino)-2,6-naphthalenedisulfonic acid derivative | 4-amino-3-aminobenzenesulfonic acid | Cl | 2-amino-6-($SO_2CH_2CH_2OSO_3H$)-1-naphthalenesulfonic acid | Red |
| 186 | " | " | " | 3-$H_2N$-C₆H₄-$SO_2CH_2CH_2OSO_3H$ | " |
| 187 | " | 4-amino-3-aminobenzenesulfonic acid | Cl | 3-$H_2N$-C₆H₄-$SO_2CH_2CH_2OSO_3H$ | Red |
| 188 | " | $H_2N$-C₆H₃(SO₃H)₂-NH₂ | " | " | " |
| 189 | " | " | " | 4-$H_2N$-C₆H₄-$SO_2CH_2CH_2OSO_3H$ | " |

-continued

| Example No. | Compound of Formula (V) | Compound of Formula (II) | Cyanuric chloride or fluoride | Compound of Formula (III) | Shade |
|---|---|---|---|---|---|
| 190 | (C$_2$H$_5$)$_2$N-, SO$_3$H, HO-, HO$_3$S- naphthalene | 4-SO$_3$H, 2-NH$_2$, 5-CH$_3$, H$_2$N- benzene | " | " | " |
| 191 | (C$_2$H$_5$)$_2$N-, SO$_3$H, HO-, HO$_3$S- naphthalene | SO$_3$H, NH$_2$, H$_2$N- benzene | " | 2-amino-1-SO$_3$H-6-SO$_2$CH$_2$CH$_2$OSO$_3$H naphthalene | " |
| 192 | " | SO$_3$H, NH$_2$, H$_2$N- benzene | Cl | 3-amino-SO$_2$CH$_2$CH$_2$OSO$_3$H benzene | Red |
| 193 | " | SO$_3$H, NH$_2$, H$_2$N- benzene | " | " | Bluish red |
| 194 | " | SO$_3$H, SO$_3$H, NH$_2$, H$_2$N- benzene | " | " | Red |

-continued

| Example No. | Compound of Formula (V) | Compound of Formula (II) | Cyanuric chloride or fluoride | Compound of Formula (III) | Shade |
|---|---|---|---|---|---|
| 195 | ![naphthalene with OH, HO₃S, N(C₂H₅)(COCH₃), SO₃H] | ![benzene with SO₃H, Cl, NH₂, H₂N] | " | ![benzene with H₂N—, —SO₂CH₂CH₂OSO₃H] | " |
| 196 | " | ![benzene with SO₃H, CH₃, NH₂, H₂N] | " | " | " |

EXAMPLE 197

Example 63 was repeated, provided that 2-methyl-amino-8-hydroxynaphthalene-3, 6-disulfonic acid (33.3 parts) was used in place of 7-ethylamino-1-naphthol-3-sulfonic acid (26.7 parts), thereby obtaining a monoazo compound represented by the following formula (197) in a free acid form.

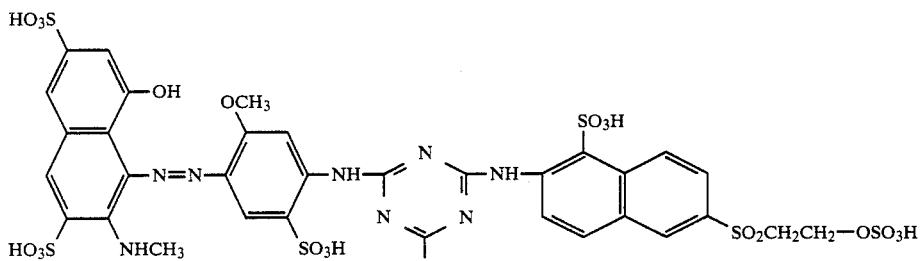

(197)

($\lambda_{max}$ 530 nm)

EXAMPLES 198 to 233

Example 63 was repeated, provided that each naphthol compound of the formula (V) shown is a second column of the following table was used in place of 7-ethylamino-1-naphthol-3-sulfonic acid, each nitro compound of the formula (IX) shown in a third column in place of 2-methoxy-4-nitroaniline-5-sulfonic acid, cyanuric chloride or fluoride as shown in a fourth column in which Cl and F denote cyanuric chloride and cyanuric fluoride, respectively, and each aromatic amine compound shown in a fifth column in place of 2-aminonaphthalene-6-$\beta$-sulfatoethylsulfone-1-sulfonic acid, thereby obtaining the corresponding desired monoazo compound.

| Example No. | Compound of Formula (V) | Compound of Formula (IX) | Cyanuric chloride or fluoride | Compound of Formula (III) | Shade |
|---|---|---|---|---|---|
| 198 | HO, NHCH₃, HO₃S, SO₃H naphthalene | OCH₃, H₂N—NO₂, SO₃H | Cl | H₂N—naphthalene—SO₃H, SO₂CH₂CH₂OSO₃H | Bluish red |
| 199 | HO, NHCH₃, HO₃S, SO₃H naphthalene | OCH₃, H₂N—NO₂, SO₃H | Cl | H₂N—phenyl—SO₂CH₂CH₂OSO₃H | Bluish red |
| 200 | HO, NHCH₃, HO₃S, SO₃H naphthalene | OC₂H₅, H₂N—NO₂, SO₃H | Cl | H₂N—phenyl—SO₂CH₂CH₂OSO₃H | Bluish red |
| 201 | HO, NHCH₃, HO₃S, SO₃H naphthalene | OC₂H₅, H₂N—NO₂, SO₃H | Cl | H₂N—naphthalene—SO₂CH₂CH₂OSO₃H, SO₃H | Bluish red |
| 202 | HO, NHCH₃, HO₃S, SO₃H naphthalene | SO₃H, H₂N—NO₂, OCH₃ | F | H₂N—naphthalene—SO₂CH₂CH₂OSO₃H, SO₃H | Bluish red |
| 203 | HO, NHCH₃, HO₃S, SO₃H naphthalene | SO₃H, H₂N—NO₂, OCH₃ | Cl | C₂H₅, HN—phenyl—SO₂CH₂CH₂OSO₃H | Bluish red |

-continued

| Example No. | Compound of Formula (V) | Compound of Formula (IX) | Cyanuric chloride or fluoride | Compound of Formula (III) | Shade |
|---|---|---|---|---|---|
| 204 | HO, NHC₂H₅, HO₃S, SO₃H (naphthalene) | OCH₃, H₂N-, -NO₂, SO₃H | Cl | SO₃H, H₂N- (naphthalene) -SO₂CH₂CH₂OSO₃H | Bluish red |
| 205 | HO, NHC₂H₅, HO₃S, SO₃H (naphthalene) | OCH₃, H₂N-, -NO₂, SO₃H | Cl | H₂N-⟨⟩-SO₂CH₂CH₂OSO₃H | Bluish red |
| 206 | HO, NHC₂H₅, HO₃S, SO₃H (naphthalene) | OC₂H₅, H₂N-, -NO₂, SO₃H | Cl | H₂N-⟨⟩-SO₂CH₂CH₂OSO₃H | Bluish red |
| 207 | HO, NHC₂H₅, HO₃S, SO₃H (naphthalene) | OCH₃, H₂N-, -NO₂, SO₃H | Cl | SO₃H, H₂N- (naphthalene) -SO₂CH₂CH₂OSO₃H | Bluish red |
| 208 | HO, NHC₂H₅, HO₃S, SO₃H (naphthalene) | SO₃H, H₂N-, -NO₂, OCH₃ | F | SO₃H, H₂N- (naphthalene) -SO₂CH₂CH₂OSO₃H | Bluish red |
| 209 | HO, NHC₂H₅, HO₃S, SO₃H (naphthalene) | SO₃H, H₂N-, -NO₂, OCH₃ | Cl | OCH₃, H₂N-⟨⟩-SO₂CH₂CH₂OSO₃H | Bluish red |
| 210 | HO, NHCH₂CH₂CH₃, HO₃S, SO₃H (naphthalene) | OCH₃, H₂N-, -NO₂, SO₃H | Cl | H₂N-⟨⟩-SO₂CH₂CH₂OSO₃H | Bluish red |
| 211 | HO, NHCH₂CH₂CH₃, HO₃S, SO₃H (naphthalene) | OCH₃, H₂N-, -NO₂, SO₃H | Cl | SO₃H, H₂N- (naphthalene) -SO₂CH₂CH₂OSO₃H | Bluish red |
| 212 | HO, NHCH₂CH₂CH₃, HO₃S, SO₃H (naphthalene) | OC₂H₅, H₂N-, -NO₂, SO₃H | Cl | SO₃H, H₂N- (naphthalene) -SO₂CH₂CH₂OSO₃H | Bluish red |
| 213 | HO, NHCH₂CH₂CH₃, HO₃S, SO₃H (naphthalene) | OC₂H₅, H₂N-, -NO₂, SO₃H | F | H₂N-⟨⟩-SO₂CH₂CH₂OSO₃H | Bluish red |
| 214 | HO, NHCH₂CH₂CH₃, HO₃S, SO₃H (naphthalene) | SO₃H, H₂N-, -NO₂, OCH₃ | F | H₂N-⟨⟩-SO₂CH₂CH₂OSO₃H | Bluish red |

| Example No. | Compound of Formula (V) | Compound of Formula (IX) | Cyanuric chloride or fluoride | Compound of Formula (III) | Shade |
|---|---|---|---|---|---|
| 215 | HO-, NHCH₂CH₂CH₃, HO₃S-, SO₃H (naphthalene) | H₂N-, SO₃H, NO₂, OCH₃ (benzene) | Cl | C₂H₄CN-HN-C₆H₄-SO₂CH₂CH₂OSO₃H | Bluish red |
| 216 | HO-, NHCH₂CH₂CH₃, HO₃S-, SO₃H | H₂N-, OCH₃, NO₂, SO₃H | Cl | C₂H₅-HN-C₆H₄-SO₂CH₂CH₂OSO₃H | Bluish red |
| 217 | HO-, NHCH₂CH₂CH₃, HO₃S-, SO₃H | H₂N-, OCH₃, NO₂, SO₃H | Cl | H₂N-C₆H₄-SO₂CH₂CH₂OSO₃H | Bluish red |
| 218 | HO-, NHCH₂CH₂CH₃, HO₃S-, SO₃H | H₂N-, OC₂H₅, NO₂, SO₃H | Cl | H₂N-C₆H₄-SO₂CH₂CH₂OSO₃H | Bluish red |
| 219 | HO-, NHCH₂CH₂CH₃, HO₃S-, SO₃H | H₂N-, OC₂H₅, NO₂, SO₃H | Cl | H₂N-, SO₃H, naphthalene-SO₂CH₂CH₂OSO₃H | Bluish red |
| 220 | HO-, NHCH₂CH₂CH₃, HO₃S-, SO₃H | H₂N-, SO₃H, NO₂, OCH₃ | Cl | H₂N-, SO₃H, naphthalene-SO₂CH₂CH₂OSO₃H | Bluish red |
| 221 | HO-, NHCH₂CH₂CH₃, HO₃S-, SO₃H | H₂N-, SO₃H, NO₂, OCH₃ | Cl | CH₃-HN-naphthalene(SO₂CH₂CH₂OSO₃H)(SO₃H) | Bluish red |
| 222 | HO-, N(CH₃)₂, HO₃S-, SO₃H | H₂N-, OCH₃, NO₂, SO₃H | Cl | H₂N-, SO₃H, naphthalene-SO₂CH₂CH₂OSO₃H | Bluish red |
| 223 | HO-, N(CH₃)₂, HO₃S-, SO₃H | H₂N-, OCH₃, NO₂, SO₃H | Cl | H₂N-C₆H₄-SO₂CH₂CH₂OSO₃H | Bluish red |
| 224 | HO-, N(CH₃)₂, HO₃S-, SO₃H | H₂N-, OC₂H₅, NO₂, SO₃H | Cl | H₂N-C₆H₄-SO₂CH₂CH₂OSO₃H | Bluish red |
| 225 | HO-, N(CH₃)₂, HO₃S-, SO₃H | H₂N-, OC₂H₅, NO₂, SO₃H | F | H₂N-, SO₃H, naphthalene-SO₂CH₂CH₂OSO₃H | Bluish red |

-continued

| Example No. | Compound of Formula (V) | Compound of Formula (IX) | Cyanuric chloride or fluoride | Compound of Formula (III) | Shade |
|---|---|---|---|---|---|
| 226 | [naphthalene with HO, HO₃S, SO₃H, N(CH₃)₂] | [benzene with SO₃H, H₂N, NO₂, OCH₃] | F | [naphthalene with SO₃H, H₂N, SO₂CH₂CH₂OSO₃H] | Bluish red |
| 227 | [naphthalene with HO, HO₃S, SO₃H, N(CH₃)₂] | [benzene with SO₃H, H₂N, NO₂, OCH₃] | Cl | [benzene with OCH₃, H₂N, CH₃, SO₂CH₂CH₂OSO₃H] | Bluish red |
| 228 | [naphthalene with HO, HO₃S, SO₃H, N(C₂H₅)₂] | [benzene with OCH₃, H₂N, NO₂, SO₃H] | Cl | [naphthalene with SO₃H, H₂N, SO₂CH₂CH₂OSO₃H] | Bluish red |
| 229 | [naphthalene with HO, HO₃S, SO₃H, N(C₂H₅)₂] | [benzene with OCH₃, H₂N, NO₂, SO₃H] | Cl | [benzene with H₂N, SO₂CH₂CH₂OSO₃H] | Bluish red |
| 230 | [naphthalene with HO, HO₃S, SO₃H, N(C₂H₅)₂] | [benzene with OC₂H₅, H₂N, NO₂, SO₃H] | Cl | [benzene with H₂N, SO₂CH₂CH₂OSO₃H] | Bluish red |
| 231 | [naphthalene with HO, HO₃S, SO₃H, N(C₂H₅)₂] | [benzene with OC₂H₅, H₂N, NO₂, SO₃H] | Cl | [naphthalene with SO₂CH₂CH₂OSO₃H, H₂N, SO₃H] | Bluish red |
| 232 | [naphthalene with HO, HO₃S, SO₃H, N(C₂H₅)₂] | [benzene with SO₃H, H₂N, NO₂, OCH₃] | Cl | [naphthalene with SO₂CH₂CH₂OSO₃H, H₂N, SO₃H] | Bluish red |
| 233 | [naphthalene with HO, HO₃S, SO₃H, N(C₂H₅)₂] | [benzene with SO₃H, H₂N, NO₂, OCH₃] | Cl | [benzene with C₂H₅-HN, SO₂CH₂CH₂OSO₃H] | Bluish red |

EXAMPLE 234

The monoazo compound (92.7 parts) represented by the following formula in a free acid form,

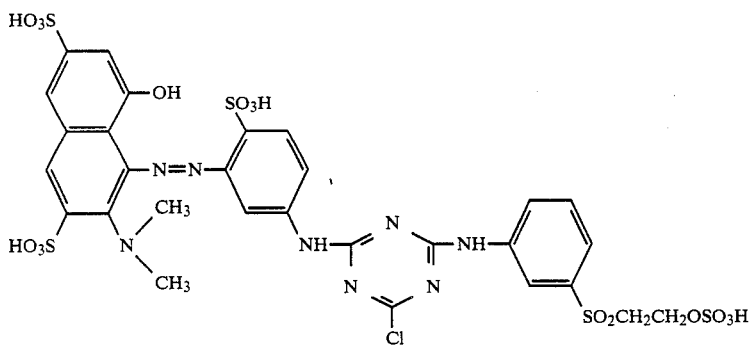

(186)

which had been obtained in Example 186, was dissolved in water (500 parts), and to this solution was added 3-aminobenzenesulfonic acid (34.6 parts). The mixture was heated upto 80° to 85° C. while controlling the pH within a range of 4 to 6 using a 20% aqueous sodium carbonate solution, and then stirred for 7 hours at that temperature and that pH. Thereafter, the reaction mixture was mixed with sodium chloride (45 parts) to deposit crystals, which were collected on a filter, washed and dried at 60° C. to obtain a monoazo compound of the following formula (234) in a free acid form.

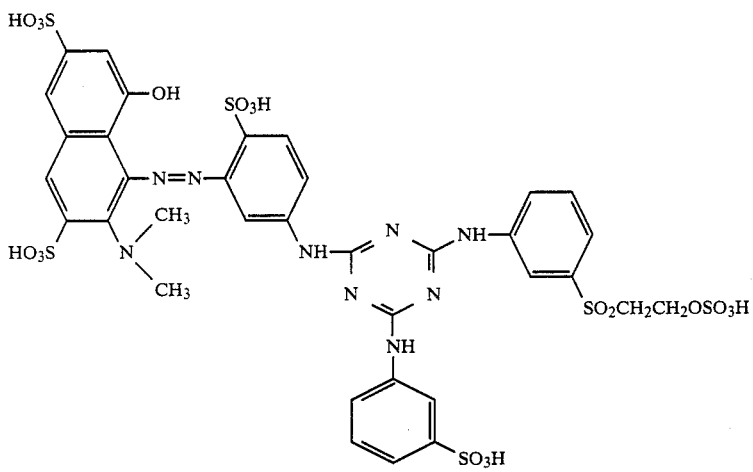

(234)

($\lambda_{max}$ 525 nm)

EXAMPLES 235 to 274

Example 234 was repeated, provided that each monoazo compound shown in a second column of the following formula, in which the monoazo compound used is expressed in terms of each Example No., was used in place of the monoazo compound obtained in Example 186, and each compound shown in a third column in place of 3-amino -bezenesulfonic acid, thereby obtaining the corresponding desired monoazo compounds.

| Example No. | Example No. of Monoazo compound obtained | Compound of Formula (VIII) | Shade |
|---|---|---|---|
| 235 | 142 | H$_2$N—⬡—SO$_3$H | Red |
| 236 | 145 | H$_2$N—⬡—SO$_3$H | Red |
| 237 | 148 | H$_2$NCH$_2$CH$_2$SO$_3$H | Bluish red |
| 238 | 149 | NH$_3$ | Red |
| 239 | 152 | H$_2$N—⬡—SO$_3$H | Red |
| 240 | 153 | CH$_3$<br>HN—⬡ | Bluish red |
| 241 | 156 | HO—⬡—SO$_3$H | Red |
| 242 | 157 | NH(CH$_2$CH$_2$OH)$_2$ | Bluish red |
| 243 | 161 | HO—⬡ | Red |

-continued

| Example No. | Example No. of Monoazo compound obtained | Compound of Formula (VIII) | Shade |
|---|---|---|---|
| 244 | 164 | 3,5-disulfo aniline (H₂N-C₆H₃(SO₃H)₂) | Red |
| 245 | 166 | CH₃-N(H)-CH₂CH₂SO₃H | Bluish red |
| 246 | 168 | 3-sulfoaniline (H₂N-C₆H₄-SO₃H) | Red |
| 247 | 169 | 3-sulfoaniline (H₂N-C₆H₄-SO₃H) | Bluish red |
| 248 | 173 | 3-sulfoaniline (H₂N-C₆H₄-SO₃H) | Red |
| 249 | 175 | 2-amino-1,5-naphthalenedisulfonic acid | Bluish red |
| 250 | 177 | naphthalene-1,6-disulfonic acid | Bluish red |
| 251 | 179 | 3-sulfoaniline (H₂N-C₆H₄-SO₃H) | Red |
| 252 | 180 | 3-sulfoaniline (H₂N-C₆H₄-SO₃H) | Bluish red |
| 253 | 182 | 3-sulfoaniline (H₂N-C₆H₄-SO₃H) | Red |
| 254 | 185 | 2-aminobenzenesulfonic acid | Red |
| 255 | 187 | NH₂(CH₂CH₂OH) | Bluish red |
| 256 | 188 | CH₃-NH-C₆H₄-SO₃H (3-) | Red |
| 257 | 191 | H₂N-C₆H₄-SO₃H (4-sulfanilic acid) | Red |
| 258 | 194 | H₂NCH₂-C₆H₅ (benzylamine) | Red |
| 259 | 197 | H₂NCH₃ | Bluish red |
| 260 | 200 | H₂NCH₂CH₃ | Bluish red |
| 261 | 203 | 2-amino-1,4-benzenedisulfonic acid | Bluish red |
| 262 | 204 | 6-amino-1,3-naphthalenedisulfonic acid | Bluish red |
| 263 | 206 | 3-sulfoaniline | Bluish red |
| 264 | 210 | 3-sulfoaniline | Bluish red |
| 265 | 213 | 3-sulfoaniline | Bluish red |
| 266 | 214 | 3-sulfoaniline | Bluish red |
| 267 | 217 | H₂NCH₂CH₂OSO₃H | Bluish red |
| 268 | 219 | H₂NCH₂CH₂OCH₃ | Bluish red |
| 269 | 222 | 7-amino-1,3,6-naphthalenetrisulfonic acid | Bluish red |
| 270 | 224 | 7-(methylamino)-naphthalene-1-sulfonic acid | Bluish red |
| 271 | 226 | H₂N-C₆H₅ (aniline) | Bluish red |
| 272 | 229 | C₂H₅-NH-C₆H₅ | Bluish red |
| 273 | 230 | CH₃-NH-C₆H₄-SO₃H (3-) | Bluish red | a monoazo compound represented by the following formula (275) in a free acid form.

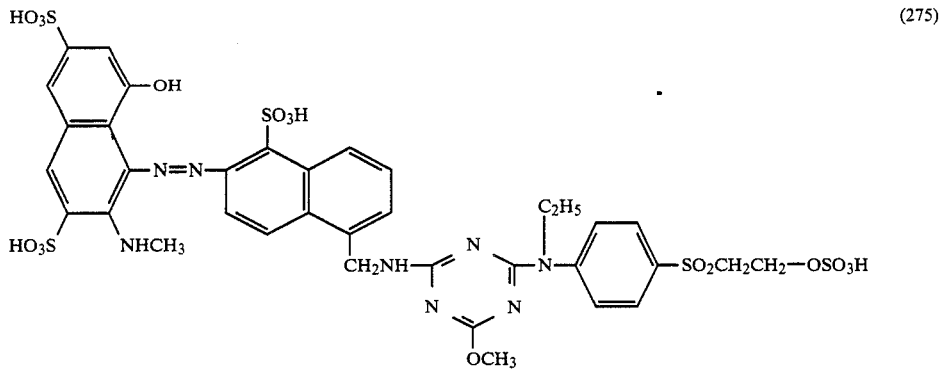

(275)

($\lambda_{max}$ 515 nm)

| Example No. | Example No. of Monoazo compound obtained | Compound of Formula (VIII) | Shade |
|---|---|---|---|
| 274 | 233 | CH₃–HN–C₆H₄–SO₃H (meta) | Bluish red |

EXAMPLE 275

Example 120 was repeated, provided that 2-methylamino-8-hydroxynaphthalene-3, 6-disulfonic acid (33.3 parts) was used in place of 7-ethylamino-1-naphthol-3-sulfonic acid (26.7 parts), thereby obtaining

EXAMPLES 276 to 293

Example 120 was repeated, provided that each diamine compound of the formula (II) shown in a third column of the following table was used in place of 2-amino-5-aminomethylnaphthalene-1-sulfonic acid, each naphthol compound of the formula (V) shown in a second column in place of 7-ethylamino-1-naphthol-3-sulfonic acid, each compound of the formula (VIII) shown in a fourth column in place of methanol, and each aromatic amine compound of the formula (III) shown in a fifth column in place of 1-ethylaminobenzene-4-β-sulfatoethylsulfone, thereby obtaining the corresponding desired monoazo compounds.

| Example No. | Compound of Formula (V) | Compound of Formula (II) | Compound of Formula (VIII) | Compound of Formula (III) | Shade |
|---|---|---|---|---|---|
| 276 | HO-naphthalene-NHCH₃, SO₃H, HO₃S | benzene with SO₃H, NH₂, H₂N, SO₃H | CH₃OH | H₂N-naphthalene-SO₃H, SO₂CH₂CH₂OSO₃H | Red |
| 277 | " | benzene with SO₃H, NH₂, H₂N, SO₃H | " | H₂N-benzene-SO₂CH₂CH₂OSO₃H | Bluish red |
| 278 | " | H₂N-naphthalene-SO₃H, CH₂NH₂ | " | " | Red |
| 279 | " | " | " | " | " |
| 280 | HO-naphthalene-NHC₂H₅, SO₃H, HO₃S | benzene with SO₃H, NH₂, H₂N, SO₃H | CH₃OH | H₂N-naphthalene-SO₂CH₂CH₂OSO₃H, SO₃H | Red |
| 281 | HO-naphthalene-NHC₂H₅, SO₃H, HO₃S | " | CH₃CH₂OH | H₂N-benzene-SO₂CH₂CH₂OSO₃H | " |

-continued

| Example No. | Compound of Formula (V) | Compound of Formula (II) | Compound of Formula (VIII) | Compound of Formula (III) | Shade |
|---|---|---|---|---|---|
| 282 | 4-hydroxy-7-sulfo-3-(n-propylamino)-2-naphthalenesulfonic acid | 2-amino-5,7-bis(aminomethyl)-naphthalene-1-sulfonic acid | CH$_3$OH | 4-(N-ethylamino)phenyl-SO$_2$CH$_2$CH$_2$OSO$_3$H | " |
| 283 | " | 2,5-diamino-benzenesulfonic acid (1-amino-4-SO$_3$H) | " | 2-amino-1-sulfo-6-(SO$_2$CH$_2$CH$_2$OSO$_3$H)-naphthalene | Bluish red |
| 284 | 4-hydroxy-7-sulfo-3-(n-propylamino)-2-naphthalenesulfonic acid | 1,4-diamino-2,5-disulfobenzene | CH$_3$OH | 3-amino-phenyl-SO$_2$CH$_2$CH$_2$OSO$_3$H | Red |
| 285 | 4-hydroxy-7-sulfo-3-(n-butylamino)-2-naphthalenesulfonic acid | " | " | " | " |
| 286 | " | 1,4-diamino-2,5-disulfobenzene | C$_2$H$_5$OH | " | Bluish red |
| 287 | " | " | CH$_3$OH | 2-amino-6-(SO$_2$CH$_2$CH$_2$OSO$_3$H)-naphthalene (1-position linkage) | Bluish red |

| Example No. | Compound of Formula (V) | Compound of Formula (II) | Compound of Formula (VIII) | Compound of Formula (III) | Shade |
|---|---|---|---|---|---|
| 288 | ![V with HO, N(CH3)2, SO3H, HO3S on naphthalene] | ![naphthalene with SO3H, H2N, CH2NH2] | (CH3)2CHOH | ![benzene with H2N, SO2CH2CH2OSO3H] | Red |
| 289 | " | ![benzene with NH2, SO3H, SO3H, H2N] | CH3OH | " | Bluish red |
| 290 | " | ![benzene with SO3H, NH2, H2N, SO3H] | " | ![naphthalene with SO3H, H2N, H2N, SO2CH2CH2OSO3H] | Red |
| 291 | ![V with HO, N(C2H5)2, SO3H, HO3S on naphthalene] | " | " | " | " |
| 292 | ![V with HO, N(C2H5)2, SO3H, HO3S on naphthalene] | ![naphthalene with SO3H, H2N, CH2NH2] | CH3OH | ![benzene with H2N, SO2CH2CH2OSO3H] | Red |
| 293 | " | ![naphthalene with SO3H, H2N, SO3H, CH2NH2] | C2H5OH | " | " |

Dyeing Example 1

The monoazo compounds (1) and (142) obtained in Examples 1 and 142 each (0.3 part) was dissolved in water (200 parts), and sodium sulfate (20 parts) and cotton (10 parts) were added thereto. The bath was heated to 50° C., and then sodium carbonate (4 parts) was added thereto. Dyeing was continued for 1 hour at that temperature. Thereafter, the cotton was washed with water and soaped to obtain a dyed product of a deep red color. Both dyed products were excellent in fastness properties, particularly formalin fastness, light fastness and perspiration light fastness, and both monoazo compounds were found to have good build-up property.

Dyeing Example 2

The monoazo compounds (63) and (197) obtained in Examples 63 and 197 each (0.3 parts) was dissolved in water (150 parts), and sodium sulfate (30 parts) and cotton (10 parts) were added thereto. The bath was heated to 60° C. 20 Minutes thereafter, sodium carbonate (4 parts) was added thereto. Dyeing was continued for 1 hour at that temperature. The cotton was washed with water and soaped to obtain a dyed product of a deep red color excellent in fastness properties, particularly formalin fastness, light fastness and perspiration light fastness, with good build-up property.

Dyeing Example 3

The monoazo compounds obtained in Examples 1 to 86 and 142 to 233 each (0.3 part) was dissolved in water (300 parts), and sodium sulfate (30 parts) and cotton (10 parts) were added thereto. The bath was heated to 60° C. 20 Minutes thereafter, sodium carbonate (5 parts) was added thereto, and dyeing was continued for 1 hour at that temperature. The cotton was washed with water and soaped to obtain a dyed product of a deep red color excellent in fastness properties, particularly formalin fastness, light fastness and perspiration fastness with good build-up property.

Dyeing Example 4

The monoazo compounds obtain in Examples 87 to 141 and 234 to 293 each (0.3 part) was dissolved in water (200 parts), and sodium sulfate (30 parts) and cotton (10 parts) were added thereto. The bath was heated to 50° C. 30 Minutes thereafter, trisodium phosphate 4 parts) was added thereto, and dyeing was continued for 1 hour at that temperature. Thereafter, the cotton was washed with water and soaped to obtain a dyed product of a deep red color excellent in fastness properties, particularly formalin fastness, light fastness and perspiration light fastness with good build-up property.

| Dyeing Example 5 | |
|---|---|
| Composition of color paste | Parts |
| Each of Monoazo compounds obtained in Examples 1 to 86 and 142 to 233 | 5 |
| Urea | 5 |
| Sodium alginate (5%), thickener | 50 |
| Hot water | 25 |
| Sodium hydrogencarbonate | 2 |
| Balance (water) | 13 |

Mercerized cotton broad cloth was printed with the color paste having the composition described above, and then pre-dried, subjected to steaming at 100° C. for 5 minutes, rinsed with hot water, soaped, again rinsed with hot water, and then dried. Thus, there was obtained a printed product of a deep red color excellent in fastness properties, particularly formalin fastness, light fastness and perspiration light fastness with a high fixing percent and good build-up property.

| Dyeing Example 6 | |
|---|---|
| Composition of color paste | Parts |
| Each of monoazo compounds obtained in Examples 87 to 141 and 234 to 293 | 4 |
| Urea | 5 |
| Sodium alginate (5%), thickener | 50 |
| Hot water | 25 |
| Sodium hydrogencarbonate | 2 |
| Balance (water) | 14 |

Using the color paste of the above composition, a manner similar to that of Dyeing Example 6 was repeated, provided that steaming was carried out at 120° C., thereby obtaining a dyed product like in Dyeing Example 5.

Dyeing Example 7

The monoazo compounds obtained in Examples 1 to 86 and 142 to 233 each (25 parts) was dissolved in hot water, and the solution was cooled to 25° C. 32.5% Aqueous sodium hydroxide solution (5.5 parts) and 50° Be' water glass were added thereto, and water was added to make the whole 1000 parts at 25° C. to obtain a padding liquor. Immediately thereafter, cotton cloth was padded with the padding liquor and batched up, and the cloth wrapped tightly with a polyethylene film was allowed to stand in a room kept at 20° C.

Above manner was repeated to obtain a padded cotton cloth, which was then wrapped tightly with a polyethylene film, and allowed to stand in a room kept at 5° C.

Both were allowed to stand for 20 hours, and thereafter washed with cool water and then hot water, soaped with a boiling detergent, washed with cool water and then dried.

There was observed almost no difference in their color shade and depth between the dyed products obtained after standing at 5° C. and 20° C. each for 20 hours. In this cold batch-up dyeing method, each monoazo compound was found to have good build-up property.

Dyeing Exampe 8

Using the monoazo compounds obtained in Examples 87 to 141 and 234 to 293, Dyeing Example 7 was repeated. Then, results similar to those of Dyeing Example 7 were obtained.

Dyeing Example 9

The monoazo compounds obtained in Examples 1 to 86 and 142 to 233 each (25 parts) was dissolved in hot water, and the solution was cooled to 25° C. To this solution were added 32.5% aqueous sodium hydroxide solution (10 parts) and anhydrous sodium sulfate (30 parts), and then water was added thereto make the hole 1000 parts at 25° C. Immediately thereafter, viscose rayon woben fabric was padded with the obtained padding liquor. The fabric padded was batched up, wrapped tightly with a polyethylene film, and allowed to stand in a room kept at 20° C.

The above manner was repeated to obtain the fabric padded, which was then batched-up, wrapped with a polyethylene film and then allowed to stand in a room kept at 5° C.

Both were allowed to stand for 20 hours, and thereafter washed with cool water and then hot water, soaped with a boiling detergent, then washed with cool water and dried to obtain each dyed product.

There was observed almost no difference in color shade and depth between the dyed products obtained after standing at 5° C. and 20° C. each for 20 hours.

Dyeing Example 10

Using the monoazo compounds obtained in Examples 87 to 141 and 234 to 293, a manner similar to that of Dyeing Example 9 was carried out, then obtaining results similar to those in the above Example.

Dyeing Example 11

Dyeing Example 3 was repeated, provided that sodium carbonate was used in an amount of 3 parts in place of 5 parts, thereby obtaining results similar to those in Dyeing Example 3.

Dyeing Example 12

Dyeing Example 3 was repeated, provided that the dyeing was continued at 60° C., respectively, in place of 50° C., thereby obtaining results similar to those in Dyeing Example 3.

Dyeing Example 13

Dyeing Example 3 was repeated, provided that sodium sulfate was used in an amount of 15 parts in place of 30 parts, thereby obtaining results similar to those in Dyeing Example 3.

Dyeing Example 14

Dyeing Example 4 was repeated, provided that water and sodium sulfate were used in each amount of 150 parts and 23 parts in place of 200 parts and 30 parts, respectively, thereby obtaining results similar to those in Dyeing Example 4.

What is claimed is:

1. A monoazo compound of the following formula in a free acid form,

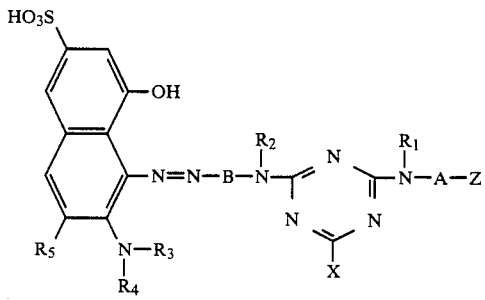

wherein $R_1$ and $R_2$ independently of one another denote hydrogen, lower alkyl unsubstituted or substituted with hydroxy, cyano, $C_1$-$C_4$ alkoxy, halogen, carboxy, carbamoyl, $C_1$-$C_4$ alkoxycarbonyl, $C_1$-$C_4$ alkylcarbonyloxy, sulfo or sulfamoyl, $R_3$ denotes lower alkyl unsubstituted or substituted with hydroxy, cyano, $C_1$-$C_4$ alkoxy, halogen, carboxy, carbamoyl, $C_1$-$C_4$ alkoxy, halogen, carboxy, carbamoyl, $C_1$-$C_4$ alkoxycarbonyl, $C_1$-$C_4$ alkylcarnoyloxy, sulfo or sulfamoyl, acetyl, propionyl, butyl, valeryl, benzoyl, or a group of the formula

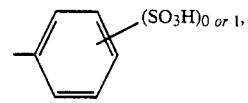

$R_4$ denotes hydrogen, lower alkyl unsubstituted or substituted with hydroxy, cyano, $C_1$-$C_4$ alkoxy, halogen, carboxy, carbamoyl, $C_1$-$C_4$ alkoxycarbonyl, $C_1$=$C_4$ alkylcarbonyloxy, sulfo or sulfamoyl, and $R_5$ denotes hydrogen or sulfo, B denotes a group of the formula,

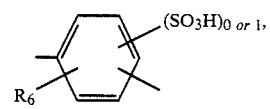

in which $R_6$ is hydrogen, chlorine, sulfo, carboxyl, methyl, methoxy or ethoxy, or a group of the formula,

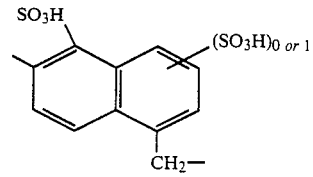

X denotes chlorine, fluorine, lower alkoxy, phenoxy, unsubstituted or substituted with $C_1$-$C_4$ alkyl, $C_1$-$C_4$ alkoxy, nitro, sulfo, carboxyl or chlorine, or a group of formula

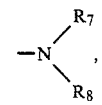

in which $R_7$ and $R_8$ independently of one another are hydrogen, lower alkyl unsubstituted or substituted with $C_1$-$C_4$ alkoxy, sulfo, carboxyl, hydroxy, chlorine, phenyl, or sulfate; phenyl unsubstituted or substituted with $C_1$-$C_4$ alkyl, $C_1$-$C_4$ alkoxy, sulfo, carboxy or chlorine; naphthyl unsubstituted or substituted with hydroxy, carboxy, sulfo, $C_1$-$C_4$ alkyl, $C_1$-$C_4$ alkoxy or chlorine; or benzyl unsubstituted or substituted with $C_1$-$C_4$ alkyl, $C_1$-$C_4$ alkoxy, sulfo chlorine; A denotes phenylene unsubstituted or substituted with methyl, ethyl, methoxy, ethoxy, chlorine, bromine or sulfo or naphthylene unsubstituted or substituted with sulfo, and Z denotes a group of the formula, —$SO_2CH$=$CH_2$ or —$SO_2CH_2CH_2Y$, in which Y is a group splittable by the action of an alkali.

2. A monoaz compound according to claim 1, wherein $R_1$ and $R_2$ independently of one another denote hydrogen or methyl or ethyl, and A denotes phenylene unsubstituted or substituted with one or two members selected from methyl, ethyl, methoxy, ethoxy, chlorine, bromine and sulfo, or naphyhylene unsubstituted or substituted with one sulfo.

3. A monoazo compound according to claim 1, wherein Z denotes —$SO_2CH$=$CH_2$, —$SO_2CH_2CH_2OSO_3H$, —$SO_2CH_2CH_2SSO_3H$, —$SO_2CH_2CH_2OPO_3H_2$ or —$SO_2CH_2CH_2OCOCH_3$ and X denotes chlorine,

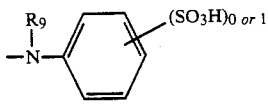

fluorine or a group of
in which $R_9$ is hydrogen or methyl or ethyl.

4. A monoazo compound according to claim 1, wherein B denotes

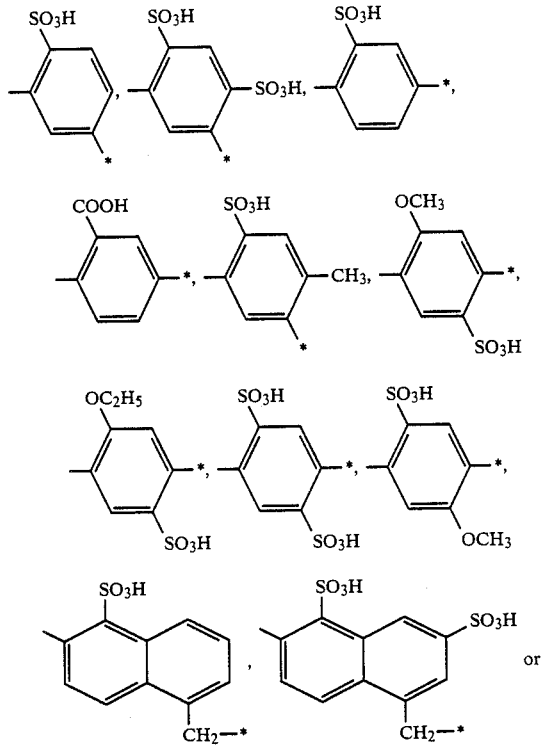

in which the asterisked linkage is bonded to the group $$-N\!\!-\!\!\overset{R_2}{\underset{}{\phantom{N}}}$$

5. A compound of the following formula in a free acid form,

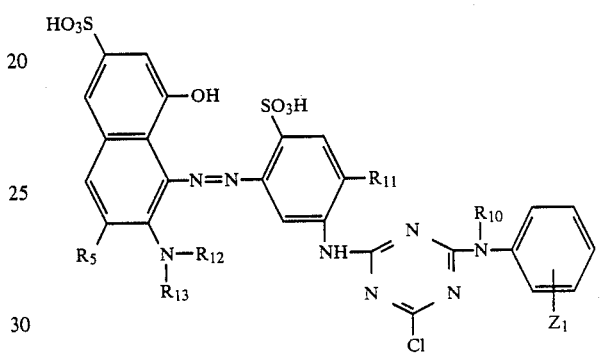

wherein $R_5$ denotes hydrogen or sulfo, $R_{10}$ denotes hydrogen, methyl or ethyl, $R_{11}$ denotes hydrogen, chlorine or sulfo, $R_{12}$ denotes methyl, ethyl, acetyl or propionyl, $R_{13}$ denotes hydrogen, methyl or ethyl, and $Z_1$ denotes $-SO_2CH=CH_2$ or $-SO_2CH_2CH_2OSO_3H$.

6. A compound of the following formula in a free acid form,

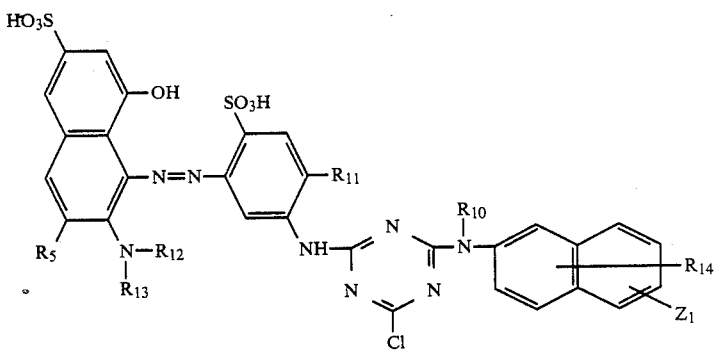

wherein $R_5$ denotes hydrogen or sulfo, $R_{10}$ denotes hydrogen, methyl or ethyl, $R_{11}$ denotes hydrogen, chlorine or sulfo, $R_{12}$ denotes methyl, ethyl, acetyl or propionyl, $R_{13}$ denotes hydrogen, methyl or ethyl, $R_{14}$ denotes hydrogen or sulfo, and $Z_1$ denotes $-SO_2CH=CH_2$ or $-SO_2CH_2CH_2OSO_3H$.

* * * * *